United States Patent
Zheng et al.

(10) Patent No.: US 9,740,566 B2
(45) Date of Patent: Aug. 22, 2017

(54) SNAPSHOT CREATION WORKFLOW

(71) Applicant: NetApp, Inc., Sunnyvale, CA (US)

(72) Inventors: Ling Zheng, Saratoga, CA (US); Long Yang, Fremont, CA (US); Kayuri H. Patel, Cupertino, CA (US); Suhas Prakash, San Jose, CA (US); Jeffrey S. Kimmel, Chapel Hill, NC (US); Anshul Pundir, Sunnyvale, CA (US); Arun Rokade, Fremont, CA (US)

(73) Assignee: NetApp, Inc., Sunnyvale, CA (US)

( * ) Notice: Subject to any disclaimer, the term of this patent is extended or adjusted under 35 U.S.C. 154(b) by 0 days.

(21) Appl. No.: 14/869,340

(22) Filed: Sep. 29, 2015

(65) Prior Publication Data
US 2017/0031769 A1 Feb. 2, 2017

Related U.S. Application Data

(60) Provisional application No. 62/199,642, filed on Jul. 31, 2015.

(51) Int. Cl.
G06F 12/10 (2016.01)
G06F 11/14 (2006.01)
G06F 3/06 (2006.01)

(52) U.S. Cl.
CPC .......... *G06F 11/1446* (2013.01); *G06F 3/065* (2013.01); *G06F 3/0619* (2013.01);
(Continued)

(58) Field of Classification Search
CPC ........................... G06F 11/1446; G06F 3/0683
(Continued)

(56) References Cited

U.S. PATENT DOCUMENTS 5,459,857 A 10/1995 Ludlam et al.
5,511,190 A 4/1996 Sharma et al.
(Continued)

FOREIGN PATENT DOCUMENTS

EP 0726521 A2 8/1996
EP 1970821 A1 9/2008
(Continued)

OTHER PUBLICATIONS

Cornwell, Michael, "Anatomy of a Solid-state Drive," ACM Queue—Networks, vol. 10, No. 10, Oct. 2012, pp. 1-7.
(Continued)

*Primary Examiner* — Jae Yu
(74) *Attorney, Agent, or Firm* — Cesari and McKenna, LLP

(57) ABSTRACT

A technique efficiently creates a snapshot for a logical unit (LUN) served by a storage input/output (I/O) stack executing on a node of a cluster that organizes data as extents referenced by keys. In addition, the technique efficiently creates one or more snapshots for a group of LUNs organized as a consistency group (CG) and served by storage I/O stacks executing on a plurality of nodes of the cluster. To that end, the technique involves a plurality of indivisible operations (i.e., transactions) of a snapshot creation workflow administered by a Storage Area Network (SAN) administration layer (SAL) of the storage I/O stack in response to a snapshot create request issued by a host. The SAL administers the snapshot creation workflow by initiating a set of transactions that includes, inter alia, (i) installation of barriers for LUNs (volumes) across all nodes in the cluster that participate in snapshot creation, (ii) creation of point-in-time (PIT) markers to record those I/O requests that are included in the snapshot, and (iii) updating of records (entries) in snapshot and volume tables of a cluster database (CDB).

20 Claims, 15 Drawing Sheets

(52) U.S. Cl.
CPC .......... *G06F 3/0659* (2013.01); *G06F 3/0683* (2013.01); *G06F 2201/84* (2013.01)

(58) Field of Classification Search
USPC ....................................................... 711/162
See application file for complete search history.

(56) References Cited

U.S. PATENT DOCUMENTS

| | | | |
|---|---|---|---|
| 5,937,425 A | 8/1999 | Ban | |
| 5,991,862 A | 11/1999 | Ruane | |
| 6,219,800 B1 | 4/2001 | Johnson et al. | |
| 6,257,756 B1 | 7/2001 | Zarubinsky et al. | |
| 6,275,898 B1 | 8/2001 | DeKoning | |
| 6,347,337 B1 | 2/2002 | Shah et al. | |
| 6,434,662 B1 | 8/2002 | Greene et al. | |
| 6,526,478 B1 | 2/2003 | Kirby | |
| 6,560,196 B1 | 5/2003 | Wei | |
| 6,578,158 B1 | 6/2003 | Deitz et al. | |
| 6,604,155 B1 | 8/2003 | Chong, Jr. | |
| 6,609,176 B1 | 8/2003 | Mizuno | |
| 6,704,839 B2 | 3/2004 | Butterworth et al. | |
| 6,741,698 B1 | 5/2004 | Jensen | |
| 6,779,003 B1 | 8/2004 | Midgley et al. | |
| 6,895,500 B1 | 5/2005 | Rothberg | |
| 6,904,470 B1 | 6/2005 | Ofer et al. | |
| 6,912,645 B2 | 6/2005 | Dorward et al. | |
| 6,928,526 B1 | 8/2005 | Zhu et al. | |
| 7,047,358 B2 | 5/2006 | Lee et al. | |
| 7,055,058 B2 | 5/2006 | Lee et al. | |
| 7,065,619 B1 | 6/2006 | Zhu et al. | |
| 7,093,086 B1 | 8/2006 | Van Rietschote | |
| 7,110,913 B2 | 9/2006 | Monroe et al. | |
| 7,174,379 B2 | 2/2007 | Agarwal et al. | |
| 7,188,149 B2 | 3/2007 | Kishimoto et al. | |
| 7,191,357 B2 | 3/2007 | Holland et al. | |
| 7,249,150 B1 | 7/2007 | Watanabe et al. | |
| 7,251,663 B1 | 7/2007 | Smith | |
| 7,257,690 B1 | 8/2007 | Baird | |
| 7,325,059 B2 | 1/2008 | Barach et al. | |
| 7,334,094 B2 | 2/2008 | Fair | |
| 7,334,095 B1 | 2/2008 | Fair et al. | |
| 7,366,865 B2 | 4/2008 | Lakshmanamurthy et al. | |
| 7,370,048 B2 | 5/2008 | Loeb | |
| 7,373,345 B2 | 5/2008 | Carpentier et al. | |
| 7,394,944 B2 | 7/2008 | Boskovic et al. | |
| 7,395,352 B1 | 7/2008 | Lam et al. | |
| 7,415,653 B1 | 8/2008 | Bonwick et al. | |
| 7,451,167 B2 | 11/2008 | Bali et al. | |
| 7,457,864 B2 | 11/2008 | Chambliss et al. | |
| 7,464,125 B1 | 12/2008 | Orszag et al. | |
| 7,529,780 B1 | 5/2009 | Braginsky et al. | |
| 7,529,830 B2 | 5/2009 | Fujii | |
| 7,543,100 B2 | 6/2009 | Singhal et al. | |
| 7,543,178 B2 | 6/2009 | McNeill et al. | |
| 7,562,101 B1 | 7/2009 | Jernigan et al. | |
| 7,562,203 B2 | 7/2009 | Scott et al. | |
| 7,603,391 B1 | 10/2009 | Federwisch et al. | |
| 7,603,529 B1 | 10/2009 | MacHardy et al. | |
| 7,644,087 B2 | 1/2010 | Barkai et al. | |
| 7,668,885 B2 | 2/2010 | Wittke et al. | |
| 7,680,837 B2 | 3/2010 | Yamato | |
| 7,681,076 B1 | 3/2010 | Sarma | |
| 7,701,948 B2 | 4/2010 | Rabje et al. | |
| 7,743,035 B2 | 6/2010 | Chen et al. | |
| 7,757,056 B1 | 7/2010 | Fair | |
| 7,797,279 B1 | 9/2010 | Starling et al. | |
| 7,814,064 B2 | 10/2010 | Vingralek | |
| 7,818,525 B1 | 10/2010 | Frost et al. | |
| 7,831,769 B1 | 11/2010 | Wen et al. | |
| 7,849,098 B1 | 12/2010 | Scales et al. | |
| 7,873,619 B1 | 1/2011 | Faibish et al. | |
| 7,899,791 B1 | 3/2011 | Gole | |
| 7,917,726 B2 | 3/2011 | Hummel et al. | |
| 7,921,169 B2 | 4/2011 | Jacobs et al. | |
| 7,921,325 B2 | 4/2011 | Kondo et al. | |
| 7,949,693 B1 | 5/2011 | Mason et al. | |
| 7,987,167 B1 | 7/2011 | Kazar et al. | |
| 7,996,636 B1 | 8/2011 | Prakash et al. | |
| 8,060,797 B2 | 11/2011 | Hida et al. | |
| 8,074,019 B2 | 12/2011 | Gupta et al. | |
| 8,078,918 B2 | 12/2011 | Diggs et al. | |
| 8,082,390 B1 | 12/2011 | Fan et al. | |
| 8,086,585 B1 | 12/2011 | Brashers et al. | |
| 8,089,969 B2 | 1/2012 | Rabie et al. | |
| 8,099,396 B1 | 1/2012 | Novick et al. | |
| 8,099,554 B1 | 1/2012 | Solomon et al. | |
| 8,127,182 B2 | 2/2012 | Sivaperuman et al. | |
| 8,131,926 B2 | 3/2012 | Lubbers et al. | |
| 8,140,821 B1 | 3/2012 | Raizen et al. | |
| 8,140,860 B2 | 3/2012 | Haswell | |
| 8,145,838 B1 | 3/2012 | Miller et al. | |
| 8,156,016 B2 | 4/2012 | Zhang | |
| 8,156,290 B1 | 4/2012 | Vanninen et al. | |
| 8,156,306 B1 | 4/2012 | Raizen et al. | |
| 8,184,807 B2 | 5/2012 | Kato et al. | |
| 8,205,065 B2 | 6/2012 | Matze | |
| 8,209,587 B1 | 6/2012 | Taylor et al. | |
| 8,214,868 B2 | 7/2012 | Hamilton et al. | |
| 8,224,935 B1 | 7/2012 | Bandopadhyay et al. | |
| 8,244,978 B2 | 8/2012 | Kegel et al. | |
| 8,250,116 B2 | 8/2012 | Mazzagatti et al. | |
| 8,261,085 B1 | 9/2012 | Fernandez | |
| 8,327,103 B1 | 12/2012 | Can et al. | |
| 8,341,457 B2 | 12/2012 | Spry et al. | |
| 8,369,217 B2 | 2/2013 | Bostica et al. | |
| 8,417,987 B1 | 4/2013 | Goel et al. | |
| 8,452,929 B2 | 5/2013 | Bennett | |
| 8,463,825 B1 | 6/2013 | Harty et al. | |
| 8,468,368 B2 | 6/2013 | Gladwin et al. | |
| 8,489,811 B1 | 7/2013 | Corbett et al. | |
| 8,495,417 B2 | 7/2013 | Jernigan, IV et al. | |
| 8,520,855 B1 | 8/2013 | Kohno et al. | |
| 8,539,008 B2 | 9/2013 | Faith et al. | |
| 8,560,879 B1 | 10/2013 | Goel | |
| 8,566,617 B1 | 10/2013 | Clifford | |
| 8,583,865 B1 | 11/2013 | Sade et al. | |
| 8,589,625 B2 | 11/2013 | Colgrove et al. | |
| 8,595,434 B2 | 11/2013 | Northcutt et al. | |
| 8,595,595 B1 | 11/2013 | Greanac et al. | |
| 8,600,949 B2 | 12/2013 | Periyagaram et al. | |
| 8,645,664 B1 | 2/2014 | Colgrove et al. | |
| 8,645,698 B2 | 2/2014 | Yi et al. | |
| 8,671,265 B2 | 3/2014 | Wright | |
| 8,706,701 B1 | 4/2014 | Stefanov et al. | |
| 8,732,426 B2 | 5/2014 | Colgrove et al. | |
| 8,751,763 B1 | 6/2014 | Ramarao | |
| 8,762,654 B1 | 6/2014 | Yang et al. | |
| 8,775,868 B2 | 7/2014 | Colgrove et al. | |
| 8,782,439 B2 | 7/2014 | Resch | |
| 8,787,580 B2 | 7/2014 | Hodges et al. | |
| 8,799,571 B1 | 8/2014 | Desroches et al. | |
| 8,799,705 B2 | 8/2014 | Hallak et al. | |
| 8,806,115 B1 | 8/2014 | Patel et al. | |
| 8,806,160 B2 | 8/2014 | Colgrove et al. | |
| 8,824,686 B1 | 9/2014 | Ishii et al. | |
| 8,832,363 B1 | 9/2014 | Sundaram et al. | |
| 8,832,373 B2 | 9/2014 | Colgrove et al. | |
| 8,839,008 B2 | 9/2014 | Maniktala | |
| 8,850,108 B1 | 9/2014 | Hayes et al. | |
| 8,855,318 B1 | 10/2014 | Patnala et al. | |
| 8,856,593 B2 | 10/2014 | Eckhardt et al. | |
| 8,874,842 B1 | 10/2014 | Kimmel et al. | |
| 8,880,787 B1 | 11/2014 | Kimmel et al. | |
| 8,892,818 B1 | 11/2014 | Zheng et al. | |
| 8,904,231 B2 | 12/2014 | Coatney et al. | |
| 8,922,928 B2 | 12/2014 | Powell | |
| 8,930,778 B2 | 1/2015 | Cohen | |
| 8,943,032 B1 | 1/2015 | Xu et al. | |
| 8,943,282 B1 | 1/2015 | Armangau et al. | |
| 8,949,568 B2 | 2/2015 | Wei et al. | |
| 8,977,781 B1 | 3/2015 | Yokoi et al. | |
| 8,996,468 B1 | 3/2015 | Mattox | |
| 8,996,535 B1 | 3/2015 | Kimmel et al. | |
| 8,996,790 B1 | 3/2015 | Segal et al. | |

(56) References Cited

U.S. PATENT DOCUMENTS

| | | |
|---|---|---|
| 8,996,797 B1 | 3/2015 | Zheng et al. |
| 9,003,162 B2 | 4/2015 | Lomet et al. |
| 9,009,449 B2 | 4/2015 | Chou et al. |
| 9,037,544 B1 | 5/2015 | Zheng et al. |
| 9,058,119 B1 | 6/2015 | Ray, III et al. |
| 9,092,142 B2 | 7/2015 | Nashimoto et al. |
| 9,152,684 B2 | 10/2015 | Zheng et al. |
| 9,195,939 B1 | 11/2015 | Goyal et al. |
| 9,229,642 B2 | 1/2016 | Shu et al. |
| 9,256,549 B2 | 2/2016 | Kimmel et al. |
| 9,268,502 B2 | 2/2016 | Zheng et al. |
| 9,274,901 B2 | 3/2016 | Veerla et al. |
| 9,298,417 B1 | 3/2016 | Muddu et al. |
| 9,367,241 B2 | 6/2016 | Sundaram et al. |
| 9,389,958 B2 | 7/2016 | Sundaram et al. |
| 9,405,783 B2 | 8/2016 | Kimmel et al. |
| 9,459,856 B2 * | 10/2016 | Curzi ................. G06F 8/65 |
| 9,471,680 B2 | 10/2016 | Elsner et al. |
| 2002/0073068 A1 | 6/2002 | Guha |
| 2002/0073354 A1 | 6/2002 | Schroiff et al. |
| 2002/0091897 A1 | 7/2002 | Chiu et al. |
| 2002/0156891 A1 | 10/2002 | Ulrich et al. |
| 2002/0174419 A1 | 11/2002 | Alvarez et al. |
| 2002/0188711 A1 | 12/2002 | Meyer et al. |
| 2003/0005147 A1 | 1/2003 | Enns et al. |
| 2003/0105928 A1 | 6/2003 | Ash et al. |
| 2003/0115204 A1 | 6/2003 | Greenblatt et al. |
| 2003/0115282 A1 | 6/2003 | Rose |
| 2003/0120869 A1 | 6/2003 | Lee et al. |
| 2003/0126118 A1 | 7/2003 | Burton et al. |
| 2003/0126143 A1 | 7/2003 | Roussopoulos et al. |
| 2003/0135729 A1 | 7/2003 | Mason et al. |
| 2003/0159007 A1 | 8/2003 | Sawdon et al. |
| 2003/0163628 A1 | 8/2003 | Lin |
| 2003/0172059 A1 | 9/2003 | Andrei |
| 2003/0191916 A1 | 10/2003 | McBrearty et al. |
| 2003/0195895 A1 | 10/2003 | Nowicki et al. |
| 2003/0200388 A1 | 10/2003 | Hetrick |
| 2003/0212872 A1 | 11/2003 | Patterson et al. |
| 2003/0223445 A1 | 12/2003 | Lodha |
| 2004/0003173 A1 | 1/2004 | Yao et al. |
| 2004/0052254 A1 | 3/2004 | Hooper |
| 2004/0054656 A1 | 3/2004 | Leung et al. |
| 2004/0107281 A1 | 6/2004 | Bose et al. |
| 2004/0133590 A1 | 7/2004 | Henderson et al. |
| 2004/0133622 A1 | 7/2004 | Clubb et al. |
| 2004/0133742 A1 | 7/2004 | Vasudevan et al. |
| 2004/0153544 A1 | 8/2004 | Kelliher et al. |
| 2004/0153863 A1 | 8/2004 | Klotz et al. |
| 2004/0215792 A1 | 10/2004 | Koning et al. |
| 2004/0236846 A1 | 11/2004 | Alvarez et al. |
| 2005/0027817 A1 | 2/2005 | Novik et al. |
| 2005/0043834 A1 | 2/2005 | Rotariu et al. |
| 2005/0076113 A1 | 4/2005 | Klotz et al. |
| 2005/0076115 A1 | 4/2005 | Andrews et al. |
| 2005/0091261 A1 | 4/2005 | Wu et al. |
| 2005/0128951 A1 | 6/2005 | Chawla et al. |
| 2005/0144514 A1 | 6/2005 | Ulrich et al. |
| 2005/0177770 A1 | 8/2005 | Coatney et al. |
| 2005/0203930 A1 | 9/2005 | Bukowski et al. |
| 2005/0246362 A1 | 11/2005 | Borland |
| 2005/0246398 A1 | 11/2005 | Barzilai et al. |
| 2006/0004957 A1 | 1/2006 | Hand et al. |
| 2006/0071845 A1 | 4/2006 | Stroili et al. |
| 2006/0072555 A1 | 4/2006 | St. Hilaire et al. |
| 2006/0072593 A1 | 4/2006 | Grippo et al. |
| 2006/0074977 A1 | 4/2006 | Kothuri et al. |
| 2006/0129676 A1 | 6/2006 | Modi et al. |
| 2006/0136718 A1 | 6/2006 | Moreillon |
| 2006/0156059 A1 | 7/2006 | Kitamura |
| 2006/0165074 A1 | 7/2006 | Modi et al. |
| 2006/0206671 A1 | 9/2006 | Aiello et al. |
| 2006/0232826 A1 | 10/2006 | Bar-El |
| 2006/0282662 A1 | 12/2006 | Whitcomb |
| 2006/0288151 A1 | 12/2006 | McKenney |
| 2007/0033433 A1 | 2/2007 | Pecone et al. |
| 2007/0061572 A1 | 3/2007 | Imai et al. |
| 2007/0064604 A1 | 3/2007 | Chen et al. |
| 2007/0083482 A1 | 4/2007 | Rathi et al. |
| 2007/0083722 A1 | 4/2007 | Per et al. |
| 2007/0094452 A1 | 4/2007 | Fachan |
| 2007/0112723 A1 | 5/2007 | Alvarez et al. |
| 2007/0136269 A1 | 6/2007 | Yamakabe et al. |
| 2007/0143359 A1 | 6/2007 | Uppala |
| 2007/0186066 A1 | 8/2007 | Desai et al. |
| 2007/0186127 A1 | 8/2007 | Desai et al. |
| 2007/0208918 A1 | 9/2007 | Harbin et al. |
| 2007/0234106 A1 | 10/2007 | Lecrone et al. |
| 2007/0245041 A1 | 10/2007 | Hua et al. |
| 2007/0266037 A1 | 11/2007 | Terry et al. |
| 2008/0065639 A1 | 3/2008 | Choudhary et al. |
| 2008/0071939 A1 | 3/2008 | Tanaka et al. |
| 2008/0104264 A1 | 5/2008 | Duerk et al. |
| 2008/0126695 A1 | 5/2008 | Berg |
| 2008/0127211 A1 | 5/2008 | Belsey et al. |
| 2008/0155190 A1 | 6/2008 | Ash et al. |
| 2008/0165899 A1 | 7/2008 | Rahman et al. |
| 2008/0201535 A1 | 8/2008 | Hara |
| 2008/0244158 A1 | 10/2008 | Funatsu et al. |
| 2008/0250270 A1 | 10/2008 | Bennett |
| 2008/0270820 A1 | 10/2008 | Kondo et al. |
| 2009/0031083 A1 | 1/2009 | Willis et al. |
| 2009/0037500 A1 | 2/2009 | Kirshenbaum |
| 2009/0037654 A1 | 2/2009 | Allison et al. |
| 2009/0083478 A1 | 3/2009 | Kunimatsu et al. |
| 2009/0097654 A1 | 4/2009 | Blake |
| 2009/0132770 A1 | 5/2009 | Lin et al. |
| 2009/0144497 A1 | 6/2009 | Withers |
| 2009/0150537 A1 | 6/2009 | Fanson |
| 2009/0157870 A1 | 6/2009 | Nakadai |
| 2009/0210611 A1 | 8/2009 | Mizushima |
| 2009/0225657 A1 | 9/2009 | Haggar et al. |
| 2009/0271412 A1 | 10/2009 | Lacapra et al. |
| 2009/0276567 A1 | 11/2009 | Burkey |
| 2009/0285476 A1 | 11/2009 | Choe et al. |
| 2009/0313503 A1 | 12/2009 | Atluri et al. |
| 2010/0011037 A1 | 1/2010 | Kazar |
| 2010/0023726 A1 | 1/2010 | Aviles |
| 2010/0030981 A1 | 2/2010 | Cook |
| 2010/0031315 A1 | 2/2010 | Feng et al. |
| 2010/0042790 A1 | 2/2010 | Mondal et al. |
| 2010/0057792 A1 | 3/2010 | Ylonen |
| 2010/0077380 A1 | 3/2010 | Baker et al. |
| 2010/0082648 A1 | 4/2010 | Potapov et al. |
| 2010/0088296 A1 | 4/2010 | Periyagaram et al. |
| 2010/0122148 A1 | 5/2010 | Flynn et al. |
| 2010/0161850 A1 | 6/2010 | Otsuka |
| 2010/0169415 A1 | 7/2010 | Leggette et al. |
| 2010/0174714 A1 | 7/2010 | Asmundsson et al. |
| 2010/0199009 A1 | 8/2010 | Koide |
| 2010/0199040 A1 | 8/2010 | Schnapp et al. |
| 2010/0205353 A1 | 8/2010 | Miyamoto et al. |
| 2010/0205390 A1 | 8/2010 | Arakawa |
| 2010/0223385 A1 | 9/2010 | Gulley et al. |
| 2010/0228795 A1 | 9/2010 | Hahn et al. |
| 2010/0228999 A1 | 9/2010 | Maheshwari et al. |
| 2010/0250497 A1 | 9/2010 | Redlich et al. |
| 2010/0250712 A1 | 9/2010 | Ellison et al. |
| 2010/0262812 A1 | 10/2010 | Lopez et al. |
| 2010/0268983 A1 | 10/2010 | Raghunandan |
| 2010/0281080 A1 | 11/2010 | Rajaram et al. |
| 2010/0293147 A1 | 11/2010 | Snow et al. |
| 2010/0306468 A1 | 12/2010 | Shionoya |
| 2011/0022778 A1 | 1/2011 | Schibilla et al. |
| 2011/0035548 A1 | 2/2011 | Kimmel et al. |
| 2011/0060876 A1 | 3/2011 | Liu |
| 2011/0066808 A1 | 3/2011 | Flynn et al. |
| 2011/0072008 A1 | 3/2011 | Mandal et al. |
| 2011/0078496 A1 | 3/2011 | Jeddeloh |
| 2011/0087929 A1 | 4/2011 | Koshiyama |
| 2011/0093674 A1 | 4/2011 | Frame et al. |
| 2011/0099342 A1 | 4/2011 | Ozdemir |
| 2011/0099419 A1 | 4/2011 | Lucas et al. |
| 2011/0126045 A1 | 5/2011 | Bennett |

(56) References Cited

U.S. PATENT DOCUMENTS

| | | |
|---|---|---|
| 2011/0153719 A1 | 6/2011 | Santoro et al. |
| 2011/0154103 A1 | 6/2011 | Bulusu et al. |
| 2011/0161293 A1 | 6/2011 | Vermeulen et al. |
| 2011/0161725 A1 | 6/2011 | Allen et al. |
| 2011/0191389 A1 | 8/2011 | Okamoto |
| 2011/0191522 A1 | 8/2011 | Condict et al. |
| 2011/0213928 A1 | 9/2011 | Grube et al. |
| 2011/0219106 A1 | 9/2011 | Wright |
| 2011/0238857 A1 | 9/2011 | Certain et al. |
| 2011/0246821 A1 | 10/2011 | Eleftheriou et al. |
| 2011/0283048 A1 | 11/2011 | Feldman et al. |
| 2011/0289565 A1 | 11/2011 | Resch et al. |
| 2011/0296133 A1 | 12/2011 | Flynn et al. |
| 2011/0307530 A1 | 12/2011 | Patterson |
| 2011/0314346 A1 | 12/2011 | Vas et al. |
| 2012/0003940 A1 | 1/2012 | Hirano et al. |
| 2012/0011176 A1 | 1/2012 | Alzman |
| 2012/0011340 A1 | 1/2012 | Flynn et al. |
| 2012/0016840 A1 | 1/2012 | Lin et al. |
| 2012/0063306 A1 | 3/2012 | Sultan et al. |
| 2012/0072656 A1 | 3/2012 | Archak et al. |
| 2012/0072680 A1 | 3/2012 | Kimura et al. |
| 2012/0078856 A1 | 3/2012 | Linde |
| 2012/0084506 A1 | 4/2012 | Colgrove et al. |
| 2012/0124282 A1 | 5/2012 | Frank et al. |
| 2012/0136834 A1 | 5/2012 | Zhao |
| 2012/0143877 A1 | 6/2012 | Kumar et al. |
| 2012/0150869 A1 | 6/2012 | Wang et al. |
| 2012/0150930 A1 | 6/2012 | Jin et al. |
| 2012/0151118 A1 | 6/2012 | Flynn et al. |
| 2012/0166715 A1 | 6/2012 | Frost et al. |
| 2012/0166749 A1 | 6/2012 | Eleftheriou et al. |
| 2012/0185437 A1 | 7/2012 | Pavlov et al. |
| 2012/0197844 A1 | 8/2012 | Wang et al. |
| 2012/0221828 A1 | 8/2012 | Fang et al. |
| 2012/0239869 A1 | 9/2012 | Chiueh et al. |
| 2012/0243687 A1 | 9/2012 | Li et al. |
| 2012/0246129 A1 | 9/2012 | Rothschild et al. |
| 2012/0246392 A1 | 9/2012 | Cheon |
| 2012/0290788 A1 | 11/2012 | Klemm et al. |
| 2012/0303876 A1 | 11/2012 | Benhase et al. |
| 2012/0310890 A1 | 12/2012 | Dodd et al. |
| 2012/0311246 A1 | 12/2012 | McWilliams et al. |
| 2012/0311290 A1 | 12/2012 | White |
| 2012/0317084 A1 | 12/2012 | Liu |
| 2012/0317338 A1 | 12/2012 | Yi et al. |
| 2012/0317353 A1 | 12/2012 | Webman et al. |
| 2012/0317395 A1 | 12/2012 | Segev et al. |
| 2012/0323860 A1 | 12/2012 | Yasa et al. |
| 2012/0324150 A1 | 12/2012 | Moshayedi et al. |
| 2013/0007097 A1 | 1/2013 | Sambe et al. |
| 2013/0010966 A1 | 1/2013 | Li et al. |
| 2013/0013654 A1 | 1/2013 | Lacapra et al. |
| 2013/0018854 A1 | 1/2013 | Condict |
| 2013/0019057 A1 | 1/2013 | Stephens |
| 2013/0042065 A1 | 2/2013 | Kasten et al. |
| 2013/0060992 A1 | 3/2013 | Cho et al. |
| 2013/0073519 A1 | 3/2013 | Lewis et al. |
| 2013/0073821 A1 | 3/2013 | Flynn et al. |
| 2013/0080679 A1 | 3/2013 | Bert |
| 2013/0086006 A1 | 4/2013 | Colgrove et al. |
| 2013/0086270 A1 | 4/2013 | Nishikawa et al. |
| 2013/0110783 A1 | 5/2013 | Wertheimer et al. |
| 2013/0110845 A1 | 5/2013 | Dua |
| 2013/0124776 A1 | 5/2013 | Hallak et al. |
| 2013/0138616 A1 | 5/2013 | Gupta et al. |
| 2013/0138862 A1 | 5/2013 | Motwani et al. |
| 2013/0166724 A1 | 6/2013 | Bairavasundaram et al. |
| 2013/0166727 A1 | 6/2013 | Wright et al. |
| 2013/0166861 A1 | 6/2013 | Takano et al. |
| 2013/0185719 A1 | 7/2013 | Kar et al. |
| 2013/0219048 A1 | 8/2013 | Arvidsson et al. |
| 2013/0226877 A1 | 8/2013 | Nagai et al. |
| 2013/0227111 A1 | 8/2013 | Wright et al. |
| 2013/0227195 A1 | 8/2013 | Beaverson et al. |
| 2013/0227201 A1 | 8/2013 | Talagala et al. |
| 2013/0227236 A1 | 8/2013 | Flynn et al. |
| 2013/0232261 A1 | 9/2013 | Wright et al. |
| 2013/0238832 A1 | 9/2013 | Dronamraju et al. |
| 2013/0238876 A1 | 9/2013 | Fiske et al. |
| 2013/0238932 A1 | 9/2013 | Resch |
| 2013/0262805 A1 | 10/2013 | Zheng et al. |
| 2013/0268497 A1 | 10/2013 | Baldwin et al. |
| 2013/0275656 A1 | 10/2013 | Talagala et al. |
| 2013/0290263 A1 | 10/2013 | Beaverson et al. |
| 2013/0305002 A1 | 11/2013 | Hallak et al. |
| 2013/0311740 A1 | 11/2013 | Watanabe et al. |
| 2013/0332688 A1 | 12/2013 | Corbett et al. |
| 2013/0346700 A1 | 12/2013 | Tomlinson et al. |
| 2013/0346720 A1 | 12/2013 | Colgrove et al. |
| 2013/0346810 A1 | 12/2013 | Kimmel et al. |
| 2014/0006353 A1 | 1/2014 | Chen et al. |
| 2014/0013068 A1 | 1/2014 | Yamato et al. |
| 2014/0052764 A1 | 2/2014 | Michael et al. |
| 2014/0068184 A1 | 3/2014 | Edwards et al. |
| 2014/0082255 A1 | 3/2014 | Powell |
| 2014/0082273 A1 | 3/2014 | Segev |
| 2014/0089683 A1 | 3/2014 | Miller et al. |
| 2014/0095758 A1 | 4/2014 | Smith et al. |
| 2014/0101115 A1 | 4/2014 | Ko et al. |
| 2014/0108350 A1 | 4/2014 | Marsden |
| 2014/0108797 A1 | 4/2014 | Johnson et al. |
| 2014/0149647 A1 | 5/2014 | Guo et al. |
| 2014/0172811 A1 | 6/2014 | Green |
| 2014/0181370 A1 | 6/2014 | Cohen et al. |
| 2014/0185615 A1 | 7/2014 | Ayoub et al. |
| 2014/0195480 A1 | 7/2014 | Talagala et al. |
| 2014/0195564 A1 | 7/2014 | Talagala et al. |
| 2014/0208003 A1* | 7/2014 | Cohen .................. G11C 16/08 711/103 |
| 2014/0215129 A1 | 7/2014 | Kuzmin et al. |
| 2014/0215170 A1 | 7/2014 | Scarpino et al. |
| 2014/0244962 A1 | 8/2014 | Arges et al. |
| 2014/0258681 A1 | 9/2014 | Prasky et al. |
| 2014/0279917 A1 | 9/2014 | Minh et al. |
| 2014/0279931 A1 | 9/2014 | Gupta et al. |
| 2014/0281055 A1 | 9/2014 | Davda et al. |
| 2014/0297980 A1 | 10/2014 | Yamazaki |
| 2014/0310231 A1 | 10/2014 | Sampathkumaran et al. |
| 2014/0310373 A1 | 10/2014 | Aviles et al. |
| 2014/0325117 A1 | 10/2014 | Canepa et al. |
| 2014/0325147 A1 | 10/2014 | Nayak |
| 2014/0344222 A1 | 11/2014 | Morris et al. |
| 2014/0379965 A1 | 12/2014 | Gole et al. |
| 2015/0019792 A1 | 1/2015 | Swanson et al. |
| 2015/0032928 A1 | 1/2015 | Andrews et al. |
| 2015/0058577 A1 | 2/2015 | Earl |
| 2015/0066852 A1 | 3/2015 | Beard et al. |
| 2015/0085665 A1 | 3/2015 | Kompella et al. |
| 2015/0085695 A1 | 3/2015 | Ryckbosch et al. |
| 2015/0089138 A1 | 3/2015 | Tao et al. |
| 2015/0095555 A1 | 4/2015 | Asnaashari et al. |
| 2015/0106556 A1 | 4/2015 | Yu et al. |
| 2015/0112939 A1 | 4/2015 | Cantwell et al. |
| 2015/0120754 A1 | 4/2015 | Chase et al. |
| 2015/0127922 A1 | 5/2015 | Camp et al. |
| 2015/0134926 A1 | 5/2015 | Yang et al. |
| 2015/0143164 A1 | 5/2015 | Veerla et al. |
| 2015/0169414 A1 | 6/2015 | Lalsangi et al. |
| 2015/0172111 A1 | 6/2015 | Lalsangi et al. |
| 2015/0193338 A1 | 7/2015 | Sundaram et al. |
| 2015/0205663 A1 | 7/2015 | Sundaram et al. |
| 2015/0220402 A1 | 8/2015 | Cantwell et al. |
| 2015/0242478 A1 | 8/2015 | Cantwell et al. |
| 2015/0244795 A1 | 8/2015 | Cantwell et al. |
| 2015/0261446 A1 | 9/2015 | Lee |
| 2015/0286438 A1 | 10/2015 | Simionescu et al. |
| 2015/0324264 A1 | 11/2015 | Chinnakkonda Vidyapoornachary et al. |
| 2015/0339194 A1 | 11/2015 | Kalos et al. |
| 2015/0355985 A1 | 12/2015 | Holtz et al. |
| 2015/0378613 A1 | 12/2015 | Koseki |
| 2016/0070480 A1 | 3/2016 | Babu et al. |
| 2016/0070618 A1 | 3/2016 | Pundir et al. |

(56) References Cited

U.S. PATENT DOCUMENTS

| | | |
|---|---|---|
| 2016/0070644 A1 | 3/2016 | D'Sa et al. |
| 2016/0070714 A1 | 3/2016 | D'Sa et al. |
| 2016/0077744 A1 | 3/2016 | Pundir et al. |
| 2016/0139838 A1 | 5/2016 | D'Sa et al. |
| 2016/0179410 A1 | 6/2016 | Haas et al. |
| 2016/0248583 A1 | 8/2016 | McClanahan et al. |

FOREIGN PATENT DOCUMENTS

| | | |
|---|---|---|
| EP | 2693358 A1 | 2/2014 |
| EP | 2735978 A1 | 5/2014 |
| WO | WO-2006050455 A2 | 5/2006 |
| WO | WO-2012132943 A1 | 10/2012 |

OTHER PUBLICATIONS

"Cuckoo hashing," Wikipedia, http://en.wikipedia.org/wiki/Cuckoo_hash, Apr. 2013, pp. 1-5.
Culik, K., et al., "Dense Multiway Trees," ACM Transactions on Database Systems, vol. 6, Issue 3, Sep. 1981, pp. 486-512.
Debnath, Biplob, et al., "FlashStore:.High Throughput Persistent Key-Value Store," Proceedings of the VLDB Endowment VLDB Endowment, vol. 3, Issue 1-2, Sep. 2010, pp. 1414-1425.
Gal, Eran et al., "Algorithms and Data Structures for Flash Memories," ACM Computing Surveys, vol. 37, No. 2, Jun. 2005, pp. 138-163.
Gray, Jim et al., "Flash Disk Opportunity for Server Applications," Queue—Enterprise Flash Storage, vol. 6, Issue 4, Jul.-Aug. 2008, pp. 18-23.
Handy, Jim, "SSSI Tech Notes: How Controllers Maximize SSD Life," SNIA, Jan. 2013, pp. 1-20.
Kagel, Art S., "two-way merge sort", Dictionary of Algorithms and Data Structures [online], May 2005 [retrieved on Jan. 28, 2015]. Retrieved from the Internet:< URL: http://xlinux.nist.gov/dads/HTMUtwowaymrgsrt.html> (1 page).
Leventhal, Adam H. "A File System All Its Own," Communications of the ACM Queue, vol. 56, No. 5, May 2013, pp. 64-67.
Lim, H. et al., "SILT: A Memory-Efficient, High-Performance Key-Value Store," Proceedings of the 23rd ACM Symposium on Operating Systems Principles (SOSP'11), Oct. 23-26, 2011, pp. 1-13.
Moshayedi, Mark, et al., "Enterprise SSDs," ACM Queue—Enterprise Flash Storage, vol. 6 No. 4, Jul.-Aug. 2008, pp. 32-39.
O'Neil et al. The log-structured merge-tree (LSM-tree). Acta Informatica, 33. pp. 351-385. 1996.
Pagh, Rasmus, et al., "Cuckoo Hashing," Elsevier Science, Dec. 8, 2003, pp. 1-27.
Pagh, Rasmus, "Cuckoo Hashing for Undergraduates," IT University of Copenhagen, Mar. 27, 2006, pp. 1-6.
Rosenblum, Mendel, et al., "The Design and Implementation of a Log-Structured File System," Proceedings of the 13th ACM Symposium on Operating Systems Principles, Jul. 24, 1991, pp. 1-15.
Rosenblum, Mendel, et al., "The LFS Storage Manager," Summer '90 USENIX Technical Conference, Anaheim, California, Jun. 1990, pp. 1-16.
Rosenblum, Mendel, "The Design and Implementation of a Log-structured File System," UC Berkeley, Thesis, 1992, pp. 1-101.
Seltzer, Margo, et al., "An Implementation of a Log Structured File System for UNIX," Winter USENIX, San Diego, CA, Jan. 25-29, 1993, pp. 1-18.
Seltzer, Margo, et al., "File System Performance and Transaction Support," UC Berkeley, Thesis, 1992, pp. 1-131.
Smith, Kent, "Garbage Collection," SandForce, Flash Memory Summit, Santa Clara, CA, Aug. 2011, pp. 1-9.
Twigg, Andy, et al., "Stratified B-trees and Versioned Dictionaries," Proceedings of the 3rd USENIX Conference on Hot Topics in Storage and File Systems, vol. 11, 2011, pp. 1-5.
Wu, Po-Liang, et al., "A File-System-Aware FTL Design for Flash-Memory Storage Systems," Design, Automation & Test in Europe Conference & Exhibition, IEEE, 2009, pp. 1-6.
Agrawal, et al., "Design Tradeoffs for SSD Performance," USENIX Annual Technical Conference, 2008, 14 Pages.
Alvaraez C., "NetApp Deduplication for FAS and V-Series Deployment and Implementation Guide," Technical Report TR-3505, 2011, 71 pages.
Amit et al., "Strategies for Mitigating the IOTLB Bottleneck," Technion—Israel Institute of Technology, IBM Research Haifa, WIOSCA 2010—Sixth Annual Workshop on the Interaction between Operating Systems and Computer Architecture, 2010, 12 pages.
Arpaci-Dusseau R., et al., "Log-Structured File Systems," Operating Systems: Three Easy Pieces published by Arpaci-Dusseau Books, May 25, 2014, 15 pages.
Balakrishnan M., et al., "CORFU: A Shared Log Design for Flash Clusters," Microsoft Research Silicon Vally, University of California, San Diego, Apr. 2012, https://www.usenix.org/conference/nsdi12/technical-sessions/presentation/balakrishnan, 14 pages.
Ben-Yehuda et al., "The Price of Safety: Evaluating IOMMU Performance," Proceedings of the Linux Symposium, vol. 1, Jun. 27-30, 2007, pp. 9-20.
Bitton D. et al., "Duplicate Record Elimination in Large Data Files," Oct. 26, 1999, 11 pages.
Bogaerdt, "cdeftutorial," http://oss.oetiker.ch/rrdtool/tut/cdeftutorial.en.html Date obtained from the internet, Sep. 9, 2014, 14 pages.
Bogaerdt, "Rates, Normalizing and Consolidating," http://www.vandenbogaerdl.nl/rrdtool/process.php Date obtained from the internet: Sep. 9, 2014, 5 pages.
Bogaerdt, "rrdtutorial," http://oss.oetiker.ch/rrdtool/lul/rrdtutorial.en.html Date obtained from the internet, Sep. 9, 2014, 21 pages.
Chris K., et al., "How many primes are there?" Nov. 2001. https://web.archive.org/web/20011120073053/http://primes.utm.edu/howmany.shtml.
Debnath, et al., "ChunkStash: Speeding up in line Storage Deduplication using Flash Memory," USENIX, USENIXATC '10, Jun. 2010, 15 pages.
Fan, et al., "MemC3: Compact and Concurrent MemCache with Dumber Caching and Smarter Hashing," USENIX NSDI '13, Apr. 2013, pp. 371-384.
Final Office Action mailed Dec. 2, 2015, for U.S. Appl. No. 14/684,956, filed Apr. 13, 2015, 12 pages.
Final Office Action mailed Dec. 22, 2015, for U.S. Appl. No. 13/857,008, filed Apr. 4, 2013, 10 pages.
Final Office Action mailed Dec. 4, 2013, for U.S. Appl. No. 13/856,997, filed Apr. 4, 2013, 25 pages.
Final Office Action mailed Dec. 4, 2015, for U.S. Appl. No. 14/454,197, filed Aug. 7, 2014, 11 pages.
Final Office Action mailed Feb. 16, 2016, for U.S. Appl. No. 14/186,847, filed Feb. 21, 2014, 25 pages.
Final Office Action mailed Feb. 2, 2016, for U.S. Appl. No. 13/856,958, filed Apr. 4, 2013, 18 pages.
Final Office Action mailed Feb. 6, 2014, for U.S. Appl. No. 13/856,958, filed Apr. 4, 2013, 16 pages.
Final Office Action mailed Mar. 2, 2016 for U.S. Appl. No. 14/701,832, filed May 1, 2015, 16 pages.
Final Office Action mailed May 13, 2013, for U.S. Appl. No. 13/041,122, filed Mar. 4, 2011, 22 pages.
Final Office Action mailed Nov. 25. 2015, for U.S. Appl. No. 14/684,966, filed Apr. 13, 2015, 21 pages.
Gulati et al., "Basil: Automated IO Load Balancing Across Storage Devices," Proceedings of the 8th USENIX Conference on File and Storage Technologies, FAST'10, Berkeley, CA, USA, 2010, 14 pages.
Hwang K., et al., "RAID-x: A New Distributed Disk Array for I/O-centric Cluster Computing," IEEE High-Performance Distributed Computing, Aug. 2000, pp. 279-286.
Intel, Product Specification—Intel® Solid-State Drive DC S3700, Jun. 2013, 32 pages.
International Search Report and Written Opinion for Application No. PCT/EP2014/071446 mailed on Apr. 1, 2015, 14 pages.

(56) References Cited

OTHER PUBLICATIONS

International Search Report and Written Opinion for Application No. PCT/US2012/071844 mailed Mar. 1, 2013, 12 pages.
International Search Report and Written Opinion for Application No. PCT/US2014/035284 mailed on Apr. 1, 2015, 8 pages.
International Search Report and Written Opinion for Application No. PCT/US2014/055138 mailed on Dec. 12, 2014, 13 pages.
International Search Report and Written Opinion for Application No. PCT/US2014/058728 mailed on Dec. 16, 2014, 11 pages.
International Search Report and Written Opinion for Application No. PCT/US2014/060031 mailed on Jan. 26, 2015, 9 pages.
International Search Report and Written Opinion for Application No. PCT/US2014/071446 mailed on Apr. 1, 2015, 13 pages.
International Search Report and Written Opinion for Application No. PCT/US2014/071465 mailed on Mar. 25, 2015, 12 pages.
International Search Report and Written Opinion for Application No. PCT/US2014/071484 mailed on Mar. 25, 2015, 9 pages.
International Search Report and Written Opinion for Application No. PCT/US2014/071581 mailed on Apr. 10, 2015, 9 pages.
International Search Report and Written Opinion for Application No. PCT/US2014/071635 mailed on Mar. 31, 2015, 13 pages.
International Search Report and Written Opinion for Application No. PCT/US2015/016625 mailed on Sep. 17, 2015, 8 pages.
International Search Report and Written Opinion for Application No. PCT/US2015/021285 mailed Jun. 23, 2015, 8 pages.
International Search Report and Written Opinion for Application No. PCT/US2015/024067 mailed Jul. 8, 2015, 7 pages.
International Search Report and Written Opinion for Application No. PCT/US2015/048800 mailed on Nov. 25, 2015, 11 pages.
International Search Report and Written Opinion for Application No. PCT/US2015/048833 mailed on Nov. 25, 2015, 11 pages.
International Search Report and Written Opinion for Application No. PCT/US2015/056932 mailed on Jan. 21, 2016, 11 pages.
International Search Report and Written Opinion for Application No. PCT/US2015/057532 mailed on Feb. 9, 2016, 12 pages.
Lamport L., "The Part-Time Parliament," ACM Transactions on Computer Systems, May 1998, vol. 16 (2), pp. 133-169.
Metreveli et al. "CPHash: A Cache-Partitioned Hash Table." Nov. 2011. https://people.csail.mit.edu/nickolai/papers/metrevelicphash-tr.pdf.
Non-Final Office Action mailed Aug. 12, 2015, for U.S. Appl. No. 14/684,929, filed Apr. 13, 2015, 20 pages.
Non-Final Office Action mailed Aug. 13, 2015, for U.S. Appl. No. 13/856,958, filed Apr. 4, 2013, 15 pages.
Non-Final Office Action mailed Aug. 13, 2015, for U.S. Appl. No. 14/186,847, filed Feb. 21, 2014, 20 pages.
Non-Final Office Action mailed Aug. 21, 2013, for U.S. Appl. No. 13/856,997, filed Apr. 4, 2013, 19 pages.
Non-Final Office Action mailed Aug. 7, 2015, for U.S. Appl. No. 14/684,894, filed Apr. 13, 2015, 10 pages.
Non-Final Office Action mailed Dec. 5, 2012, for U.S. Appl. No. 13/041,122, filed Mar. 4, 2011, 21 pages.
Non-Final Office Action mailed Jan. 29, 2016, for U.S. Appl. No. 14/454,197, filed Aug. 7, 2014, 11 pages.
Non-Final Office Action mailed Jul. 1, 2015, for U.S. Appl. No. 13/857,008, filed Apr. 4, 2013, 10 pages.
Non-Final Office Action mailed Jul. 14, 2015, for U.S. Appl. No. 14/454,197, filed Aug. 7, 2014, 5 pages.
Non-Final Office Action mailed Jul. 14, 2015, for U.S. Appl. No. 14/684,956, filed Apr. 13, 2015, 5 pages.
Non-Final Office Action mailed Jul. 14. 2015, for U.S. Appl. No. 14/684,966, filed Apr. 13, 2015, 21 pages.
Non-Final Office Action mailed Jul. 29, 2015, for U.S. Appl. No. 14/292,089, filed May 30, 2014, 4 pages.
Non-Final Office Action mailed Jul. 31, 2013, for U.S. Appl. No. 13/856,958, filed Apr. 4, 2013, 15 pages.
Non-Final Office Action mailed Jul. 31, 2015 for U.S. Appl. No. 14/259,467, filed Apr. 23, 2014, 10 pages.
Non-Final Office Action mailed Jul. 31, 2015, for U.S. Appl. No. 14/684,942, filed Apr. 13, 2015, 4 pages.
Non-Final Office Action mailed Jun. 17, 2013, for U.S. Appl. No. 13/041,095, filed Mar. 4, 2011, 10 pages.
Non-Final Office Action mailed Jun. 30, 2015, for U.S. Appl. No. 14/057,145, filed Oct. 18, 2015, 21 pages.
Non-Final Office Action mailed Mar. 31, 2016, for U.S. Appl. No. 14/941,938, filed Nov. 16, 2015, 8 pages.
Non-Final Office Action mailed Oct. 19, 2015, for U.S. Appl. No. 14/701,832, filed May 1, 2015, 11 pages.
Non-Final Office Action mailed on Jan. 26, 2016 for U.S. Appl. No. 14/932,063, filed Nov. 4, 2015, 9 pages.
Non-Final Office Action mailed Sep. 10, 2014, for U.S. Appl. No. 13/338,039, filed Dec. 27, 2011, 10 pages.
Notice Allowance mailed Jan. 21, 2016, for U.S. Appl. No. 14/684,894, filed Apr. 13, 2015, 13 pages.
Notice of Allowance mailed Apr. 14, 2015, for U.S. Appl. No. 13/856,997, filed Apr. 4, 2013, 18 pages.
Notice of Allowance mailed Apr. 24, 2014, for U.S. Appl. No. 13/041,122, filed Mar. 4, 2011, 14 pages.
Notice of Allowance mailed Aug. 24, 2016, for U.S. Appl. No. 14/684,956, filed Apr. 13, 2015, 4 pages.
Notice of Allowance mailed Aug. 27, 2015 for U.S. Appl. No. 14/684,914, filed Apr. 13, 2015, 10 pages.
Notice of Allowance mailed Dec. 8, 2014, for U.S. Appl. No. 13/338,039, filed Dec. 27, 2011, 7 pages.
Notice of Allowance mailed Feb. 22, 2016, for U.S. Appl. No. 14/057,145, filed Oct. 18, 2015, 12 pages.
Notice of Allowance mailed Mar. 29, 2016, for U.S. Appl. No. 14/454,197, filed Aug. 7, 2014, 7 pages.
Notice of Allowance mailed May 4, 2016 for U.S. Appl. No. 14/932,063, filed Nov. 4, 2015, 7 pages.
Notice of Allowance mailed Oct. 9, 2013, for U.S. Appl. No. 13/041,095, filed Mar. 4, 2011, 7 pages.
Oetiker, "rrdfetch," http ://oss.oetiker.ch/rrdtool/doc/rrdfetch .en. html, Date obtained from the internet: Sep. 9, 2014, 5 pages.
Oetiker, "rrdtool," http :/loss. oetiker.ch/rrdtool/doc/rrdtool.en. html Date obtained from the internet: Sep. 9, 2014, 5 pages.
Ongaro D., et al., "In Search of an Understandable Consensus Algorithm," Stanford University, URL: https://ramcloud.stanford.edu/wiki/download/attachments/11370504/raft.pdf, May 2013, 14 pages.
Ongaro, et al., "In search of an understandable consensus algorithm (extended version)," 2014, 18 pages.
Proceedings of the FAST 2002 Conference on File Storage Technologies, Monterey, California, USA, Jan. 28-30, 2002, 14 pages.
Rosenblum M., et al., "The Design and Implementation of a Log-Structured File System," In Proceedings of ACM Transactions on Computer Systems, vol. 10(1),Feb. 1992, pp. 26-52.
Rosenblum M., et al., "The Design and Implementation of a Log-Structured File System," (SUN00006867-SUN00006881), Jul. 1991, 15 pages.
Rosenblum M., et al., "The LFS Storage Manager," USENIX Technical Conference, Anaheim, CA, (Sun 00007397-SUN00007412), Jun. 1990, 14 pages.
Sears., et al., "Blsm: A General Purpose Log Structured Merge Tree," Proceedings of the 2012 ACM SIGMOD International Conference on Management, 2012, 12 pages.
Stoica et al. "Chord: A Scalable Peer-to-peer Lookup Service for Internet Applications." Aug. 2001. ACM. SIGCOMM '01.
Supplementary European Search Report for Application No. EP12863372 mailed on Jul. 16, 2015, 7 pages.
Texas Instruments, User Guide, TMS320C674x/OMAP-L1 x Processor Serial ATA (SATA) Controller, Mar. 2011, 76 Pages.
Wilkes J., et al., "The Hp Auto Raid Hierarchical Storage System," Operating System Review, ACM, New York, NY, Dec. 1, 1995, vol. 29 (5), pp. 96-108.

\* cited by examiner

SNAPSHOT CREATION WORKFLOW

RELATED APPLICATION

The present application claims priority from commonly owned Provisional Patent Application No. 62/199,642, entitled SNAPSHOT CREATION WORKFLOW, filed on Jul. 31, 2015, the contents of which are incorporated herein by reference.

BACKGROUND

Technical Field

The present disclosure relates to storage systems and, more specifically, to creation of snapshots of volumes in a storage system.

Background Information

A storage system typically includes one or more storage devices, such as solid state drives (SSDs), into which information may be entered, and from which information may be obtained, as desired. The storage system may implement a high-level module, such as a file system, to logically organize the information stored on the devices as storage containers, such as volumes. Each volume may be implemented as a set of data structures, including data blocks that store data for the volumes and metadata blocks that describe the data of the volumes. For example, the metadata may describe, e.g., identify, storage locations on the devices for the data.

Management of the volumes may include creation of snapshots (read-only) of the volumes taken at points in time and accessed by one or more clients (hosts) of the storage system. Operations may be performed by the storage system at the points in time to ensure consistency of each created snapshot. For example, operations may be directed to sharing metadata of a data structure between volumes (e.g., parent and snapshot) and allowing reference counting of that data structure. In addition, administration of the volumes may be simplified by collective management of the volumes, e.g., snapshot for each volume using one command. Thus, it is desirable to provide an efficient workflow for the operations performed by a storage system to create a snapshot or collection of snapshots for one or more volumes.

BRIEF DESCRIPTION OF THE DRAWINGS

The above and further advantages of the embodiments herein may be better understood by referring to the following description in conjunction with the accompanying drawings in which like reference numerals indicate identically or functionally similar elements, of which.

OVERVIEW

Figure 1:
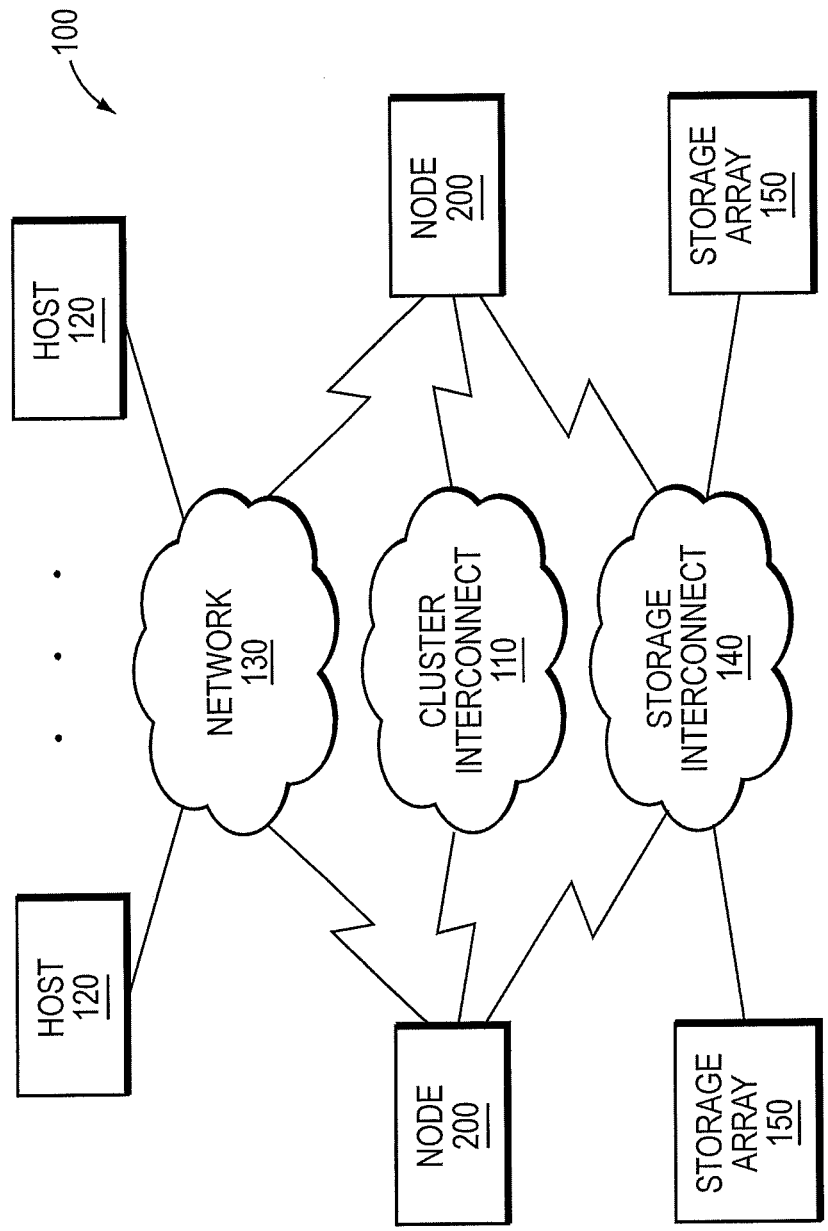
FIG. 1 is a block diagram of a plurality of nodes interconnected as a cluster.

The embodiments described herein are directed to a technique for efficiently creating a snapshot for a logical unit (LUN) served by a storage input/output (I/O) stack executing on a node of a cluster that organizes data as extents referenced by keys. In addition, the technique efficiently creates one or more snapshots for a group of LUNs organized as a consistency group (CG) (i.e., a set of LUNs having collectively applied management operations) and served by storage I/O stacks executing on a plurality of nodes of the cluster. To that end, the technique involves a plurality of indivisible operations (i.e., transactions) of a snapshot creation workflow administered by a Storage Area Network (SAN) administration layer (SAL) of the storage I/O stack in response to a snapshot create request issued by a host. The SAL administers the snapshot creation workflow by initiating a set of transactions that includes, inter alia, (i) installation of barriers for LUNs (volumes) across all nodes in the cluster that participate in snapshot creation, (ii) creation of point-in-time (PIT) markers to record those I/O requests that are included in the snapshot, and (iii) updating of records (entries) in snapshot and volume tables of a cluster database (CDB).

Installation of a barrier for each LUN of, e.g., a single volume or set of volumes in the CG, is illustratively performed in accordance with the workflow using a 2-phase transaction protocol. A barrier set message is issued by the SAL to a persistence layer of the storage I/O stack to set a barrier flag for each LUN in a volume data structure located in a memory of each node servicing the respective LUN, wherein setting of the flag manifests establishment of a barrier delimiting the I/O requests (i.e., I/O requests received before establishment of the barrier are permitted on the LUN). The persistence layer illustratively records and maintains the barrier in-memory using a sequence number of an I/O (e.g., write) request beyond which no further write requests are allowed to proceed. Each node in the cluster installs the barrier during the barrier installation transaction. Installation of a barrier in the persistence layer ensures that from the point of installation, all new (i.e., later than establishment of the barrier) write requests directed to the LUN are blocked (queued) at the persistence layer.

Creation of the PIT marker for each LUN of, e.g., the single volume or set of volumes in the CG, is also illustratively performed as a transaction in accordance with the workflow using a 2-phase transaction protocol. Upon validating that each node installed the barrier for each LUN, the persistence layer creates and (persistently) records the respective PIT marker for each LUN using, e.g., a sequence number of the PIT transaction, a snapshot identifier and a volume identifier for each service process (service) in the persistence layer. The sequence number of the PIT transaction is used to preserve write order dependencies across the set of LUNs in the CG. If recording of the PIT is successful for each LUN, a commit point of the snapshot creation workflow is realized wherein the PIT transaction commits. The persistence layer may then forward (flush) all queued write requests up to (but not beyond) the PIT marker associated with the LUN to the volume layer. In an embodiment, the service of the persistence layer sends a snapshot create message (i.e., in response to the snapshot create request from the host) to a corresponding service of the volume layer upon receiving a reply from the volume layer for all I/O requests received up to the PIT. That is, the persistence layer waits for I/O requests that are deemed part of the snapshot to be received and acknowledged by the volume layer prior to issuing the snapshot create message. Once the snapshot is created, the persistence layer may resume forwarding writes beyond the PIT to the volume layer.

In response to the snapshot create message, the corresponding service of the volume layer creates a snapshot by, e.g., sharing a highest level (level 0) of a source volume dense tree with a snapshot dense tree, wherein sharing involves copying extent keys. Creation of the snapshot is further manifested by incrementing a reference count in level headers (e.g., level 0 header) of the dense tree and updating of a superblock. Subsequently, the volume layer sends a message to the SAL when snapshot creation has completed for all of the services. Upon receiving the message from the volume layer, the SAL updates records of the tables, i.e., the volume table and the snapshot table, of the CDB. Illustratively, the SAL marks a record for the snapshot volume state to "ONLINE" in the CDB volume table. In addition, the record for the snapshot of the LUN is marked "CREATED" in the CDB snapshot table. Once the respective snapshot for each snapshotted volume in the CG is created, SAL marks the CG snapshot as "CREATED" in the CDB snapshot table. The snapshot (or CG snapshot) is then considered online and may be accessed.

DESCRIPTION

Storage Cluster

FIG. 1 is a block diagram of a plurality of nodes 200 interconnected as a cluster 100 and configured to provide storage service relating to the organization of information on storage devices. The nodes 200 may be interconnected by a cluster interconnect fabric 110 and include functional components that cooperate to provide a distributed storage architecture of the cluster 100, which may be deployed in a storage area network (SAN). As described herein, the components of each node 200 include hardware and software functionality that enable the node to connect to one or more hosts 120 over a computer network 130, as well as to one or more storage arrays 150 of storage devices over a storage interconnect 140, to thereby render the storage service in accordance with the distributed storage architecture.

Each host 120 may be embodied as a general-purpose computer configured to interact with any node 200 in accordance with a client/server model of information delivery. That is, the client (host) may request the services of the node, and the node may return the results of the services requested by the host, by exchanging packets over the network 130. The host may issue packets including file-based access protocols, such as the Network File System (NFS) protocol over the Transmission Control Protocol/Internet Protocol (TCP/IP), when accessing information on the node in the form of storage containers such as files and directories. However, in an embodiment, the host 120 illustratively issues packets including block-based access protocols, such as the Small Computer Systems Interface (SCSI) protocol encapsulated over TCP (iSCSI) and SCSI encapsulated over FC (FCP), when accessing information in the form of storage containers such as logical units (LUNs). Notably, any of the nodes 200 may service a request directed to a storage container stored on the cluster 100.

Figure 2:
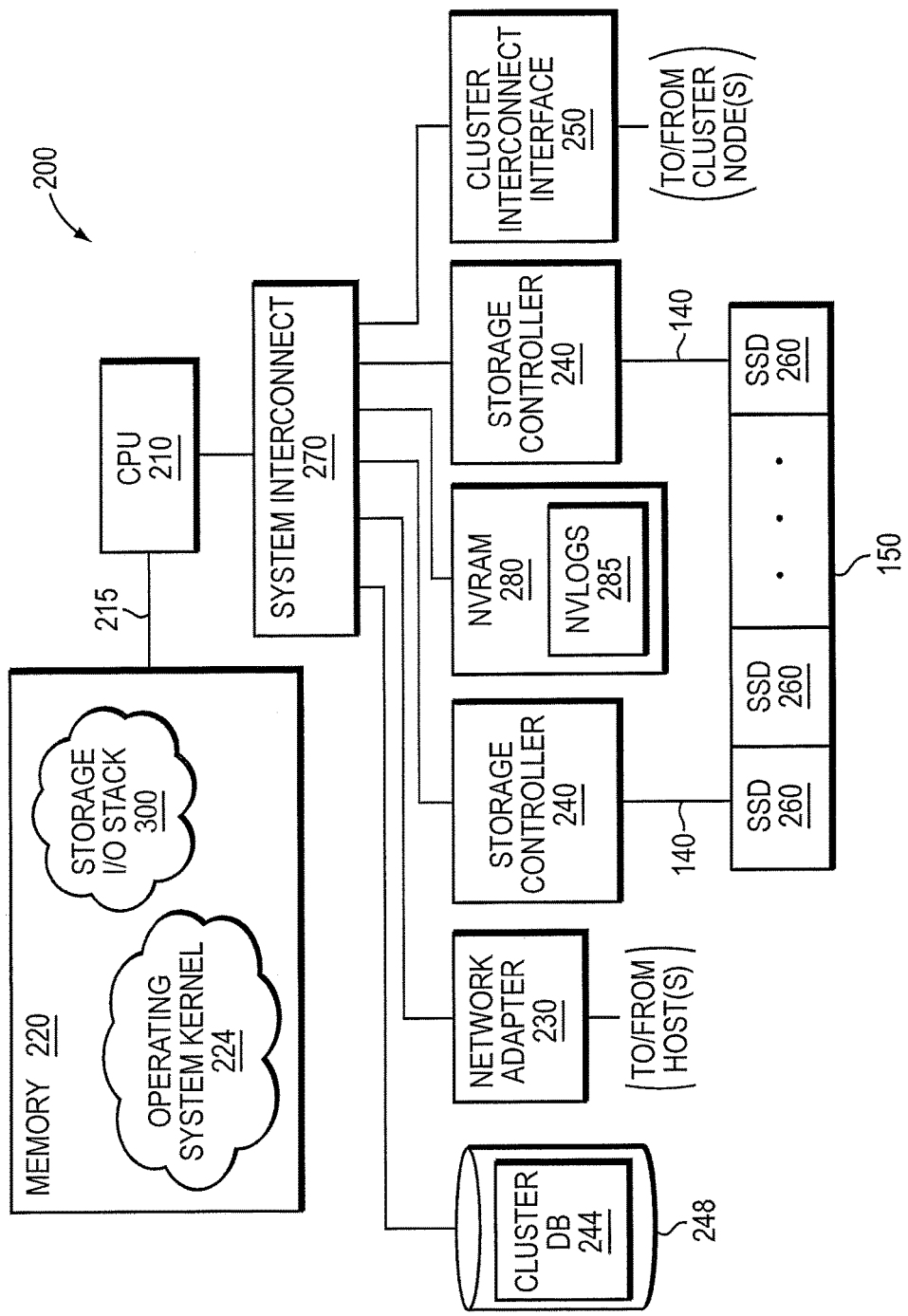
FIG. 2 is a block diagram of a node.

FIG. 2 is a block diagram of a node 200 that is illustratively embodied as a storage system having one or more central processing units (CPUs) 210 coupled to a memory 220 via a memory bus 215. The CPU 210 is also coupled to a network adapter 230, storage controllers 240, a cluster interconnect interface 250 and a non-volatile random access memory (NVRAM 280) via a system interconnect 270. The network adapter 230 may include one or more ports adapted to couple the node 200 to the host(s) 120 over computer network 130, which may include point-to-point links, wide area networks, virtual private networks implemented over a public network (Internet) or a local area network. The network adapter 230 thus includes the mechanical, electrical and signaling circuitry needed to connect the node to the network 130, which illustratively embodies an Ethernet or Fibre Channel (FC) network.

The memory 220 may include memory locations that are addressable by the CPU 210 for storing software programs and data structures associated with the embodiments described herein. The CPU 210 may, in turn, include processing elements and/or logic circuitry configured to execute the software programs, such as a storage input/output (I/O) stack 300, and manipulate the data structures. Illustratively, the storage I/O stack 300 may be implemented as a set of user mode processes that may be decomposed into a plurality of threads. An operating system kernel 224, portions of which are typically resident in memory 220 (in-core) and executed by the processing elements (i.e., CPU 210), functionally organizes the node by, inter alia, invoking operations in support of the storage service implemented by the node and, in particular, the storage I/O stack 300. A suitable operating system kernel 224 may include a general-purpose operating system, such as the UNIX® series or Microsoft Windows® series of operating systems, or an operating system with configurable functionality such as microkernels and embedded kernels. However, in an embodiment described herein, the operating system kernel is illustratively the Linux® operating system. It will be apparent to those skilled in the art that other processing and memory means, including various computer readable media, may be used to store and execute program instructions pertaining to the embodiments herein.

Each storage controller 240 cooperates with the storage I/O stack 300 executing on the node 200 to access information requested by the host 120. The information is preferably stored on storage devices such as solid state drives (SSDs) 260, illustratively embodied as flash storage devices, of storage array 150. In an embodiment, the flash storage devices may be based on NAND flash components, e.g., single-layer-cell (SLC) flash, multi-layer-cell (MLC) flash or triple-layer-cell (TLC) flash, although it will be understood to those skilled in the art that other non-volatile, solid-state electronic devices (e.g., drives based on storage class memory components) may be advantageously used with the embodiments described herein. Accordingly, the storage devices may or may not be block-oriented (i.e., accessed as blocks). The storage controller 240 includes one or more ports having I/O interface circuitry that couples to the SSDs 260 over the storage interconnect 140, illustratively embodied as a serial attached SCSI (SAS) topology. Alternatively, other point-to-point I/O interconnect arrangements, such as a conventional serial ATA (SATA) topology or a PCI topology, may be used. The system interconnect 270 may also couple the node 200 to a local service storage device 248, such as an SSD, configured to locally store cluster-related configuration information, e.g., as cluster database (DB) 244, which may be replicated to the other nodes 200 in the cluster 100.

The cluster interconnect interface 250 may include one or more ports adapted to couple the node 200 to the other node(s) of the cluster 100. In an embodiment, Infiniband may be used as the clustering protocol and interconnect fabric media, although it will be apparent to those skilled in the art that other types of protocols and interconnects may be utilized within the embodiments described herein. The NVRAM 280 may include a back-up battery or other built-in last-state retention capability (e.g., non-volatile semiconductor memory such as storage class memory) that is capable of maintaining data in light of a failure to the node and cluster environment. Illustratively, a portion of the NVRAM 280 may be configured as one or more non-volatile logs (NVLogs 285) configured to temporarily record ("log") I/O requests, such as write requests, received from the host 120.

Storage I/O Stack

Figure 3:
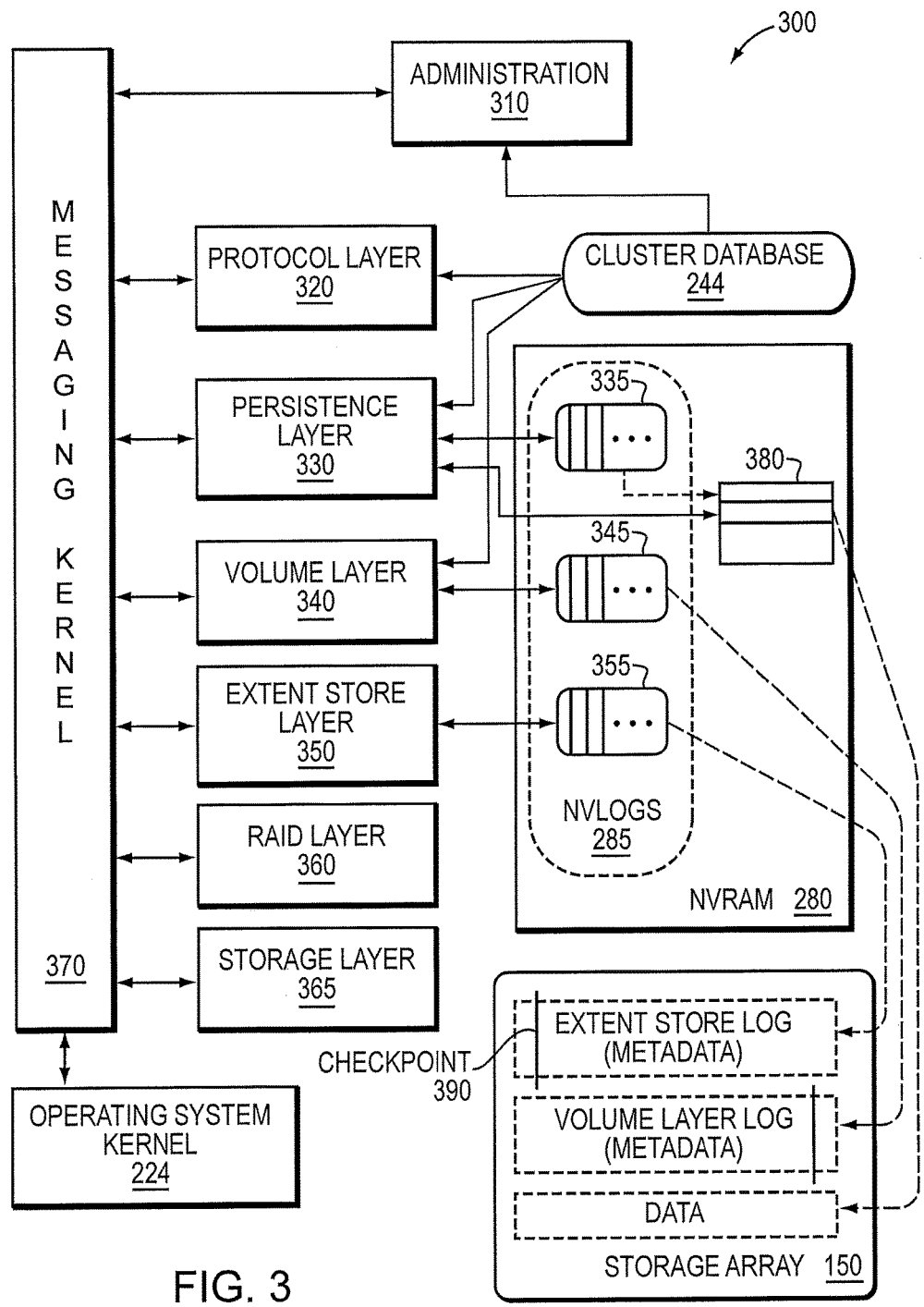
FIG. 3 is a block diagram of a storage input/output (I/O) stack of the node.

FIG. 3 is a block diagram of the storage I/O stack 300 that may be advantageously used with one or more embodiments described herein. The storage I/O stack 300 includes a plurality of software modules or layers that cooperate with other functional components of the nodes 200 to provide the distributed storage architecture of the cluster 100. In an embodiment, the distributed storage architecture presents an abstraction of a single storage container, i.e., all of the storage arrays 150 of the nodes 200 for the entire cluster 100 organized as one large pool of storage. In other words, the architecture consolidates storage, i.e., the SSDs 260 of the arrays 150, throughout the cluster (retrievable via cluster-wide keys) to enable storage of the LUNs. Both storage capacity and performance may then be subsequently scaled by adding nodes 200 to the cluster 100.

Illustratively, the storage I/O stack 300 includes an administration layer 310, a protocol layer 320, a persistence layer 330, a volume layer 340, an extent store layer 350, a Redundant Array of Independent Disks (RAID) layer 360, a storage layer 365 and a NVRAM (storing NVLogs) "layer" interconnected with a messaging kernel 370. The messaging kernel 370 may provide a message-based (or event-based) scheduling model (e.g., asynchronous scheduling) that employs messages as fundamental units of work exchanged (i.e., passed) among the layers. Suitable message-passing mechanisms provided by the messaging kernel to transfer information between the layers of the storage I/O stack 300 may include, e.g., for intra-node communication: i) messages that execute on a pool of threads, ii) messages that execute on a single thread progressing as an operation through the storage I/O stack, iii) messages using an Inter Process Communication (IPC) mechanism and, e.g., for inter-node communication: messages using a Remote Procedure Call (RPC) mechanism in accordance with a function shipping implementation. Alternatively, the I/O stack may be implemented using a thread-based or stack-based execution model. In one or more embodiments, the messaging kernel 370 allocates processing resources from the operating system kernel 224 to execute the messages. Each storage I/O stack layer may be implemented as one or more instances (i.e., processes) executing one or more threads (e.g., in kernel or user space) that process the messages passed between the layers such that the messages provide synchronization for blocking and non-blocking operation of the layers.

In an embodiment, the protocol layer 320 may communicate with the host 120 over the network 130 by exchanging discrete frames or packets configured as I/O requests according to pre-defined protocols, such as iSCSI and FCP. An I/O request, e.g., a read or write request, may be directed to a LUN and may include I/O parameters such as, inter alia, a LUN identifier (ID), a logical block address (LBA) of the LUN, a length (i.e., amount of data) and, in the case of a write request, write data. The protocol layer 320 receives the I/O request and forwards it to the persistence layer 330, which records the request into a persistent write-back cache 380, illustratively embodied as a log whose contents can be replaced randomly, e.g., under some random access replacement policy rather than only in log fashion, and returns an acknowledgement to the host 120 via the protocol layer 320. In an embodiment only I/O requests that modify the LUN, e.g., write requests, are logged. Notably, the I/O request may be logged at the node receiving the I/O request, or in an alternative embodiment in accordance with the function shipping implementation, the I/O request may be logged at another node.

Illustratively, dedicated logs may be maintained by the various layers of the storage I/O stack 300. For example, a dedicated log 335 may be maintained by the persistence layer 330 to record the I/O parameters of an I/O request as equivalent internal, i.e., storage I/O stack, parameters, e.g., volume ID, offset, and length. In the case of a write request, the persistence layer 330 may also cooperate with the NVRAM 280 to implement the write-back cache 380 configured to store the write data associated with the write request. Notably, the write data for the write request may be physically stored in the log 355 such that the cache 380 contains the reference to the associated write data. That is, the write-back cache may be structured as a log. In an embodiment, a copy of the write-back cache may be also maintained in the memory 220 to facilitate direct memory access to the storage controllers. In other embodiments, caching may be performed at the host 120 or at a receiving node in accordance with a protocol that maintains coherency between the write data stored at the cache and the cluster.

In an embodiment, the administration layer 310 may apportion the LUN into multiple volumes, each of which may be partitioned into multiple regions (e.g., allotted as disjoint block address ranges), with each region having one or more segments stored as multiple stripes on the array 150. A plurality of volumes distributed among the nodes 200 may thus service a single LUN, i.e., each volume within the LUN services a different LBA range (i.e., offset and length, hereinafter offset and range) or set of ranges within the LUN. Accordingly, the protocol layer 320 may implement a volume mapping technique to identify a volume to which the I/O request is directed (i.e., the volume servicing the offset range indicated by the parameters of the I/O request). Illustratively, the cluster database 244 may be configured to maintain one or more associations (e.g., key-value pairs) for each of the multiple volumes, e.g., an association between the LUN ID and a volume, as well as an association between the volume and a node ID for a node managing the volume. The administration layer 310 may also cooperate with the database 244 to create (or delete) one or more volumes associated with the LUN (e.g., creating a volume ID/LUN key-value pair in the database 244). Using the LUN ID and LBA (or LBA range), the volume mapping technique may provide a volume ID (e.g., using appropriate associations in the cluster database 244) that identifies the volume and node servicing the volume destined for the request, as well as translate the LBA (or LBA range) into an offset and length within the volume. Specifically, the volume ID is used to determine a volume layer instance that manages volume metadata associated with the LBA or LBA range. As noted, the protocol layer may pass the I/O request (i.e., volume ID, offset and length) to the persistence layer 330, which may use the function shipping (e.g., inter-node) implementation to forward the I/O request to the appropriate volume layer instance executing on a node in the cluster based on the volume ID.

In an embodiment, the volume layer 340 may manage the volume metadata by, e.g., maintaining states of host-visible containers, such as ranges of LUNs, and performing data management functions, such as creation of snapshots and clones, for the LUNs in cooperation with the administration layer 310. The volume metadata is illustratively embodied as in-core mappings from LUN addresses (i.e., LBAs) to durable extent keys, which are unique cluster-wide IDs associated with SSD storage locations for extents within an extent key space of the cluster-wide storage container. That is, an extent key may be used to retrieve the data of the extent at an SSD storage location associated with the extent key. Alternatively, there may be multiple storage containers in the cluster wherein each container has its own extent key space, e.g., where the host provides distribution of extents among the storage containers and cluster-wide (across containers) de-duplication is infrequent. An extent is a variable length block of data that provides a unit of storage on the SSDs and that need not be aligned on any specific boundary, i.e., it may be byte aligned. Accordingly, an extent may be an aggregation of write data from a plurality of write requests to maintain such alignment. Illustratively, the volume layer 340 may record the forwarded request (e.g., information or parameters characterizing the request), as well as changes to the volume metadata, in dedicated log 345 maintained by the volume layer 340. Subsequently, the contents of the volume layer log 345 may be written to the storage array 150 in accordance with retirement of log entries, while a checkpoint (e.g., synchronization) operation stores in-core metadata on the array 150. That is, the checkpoint operation (checkpoint) ensures that a consistent state of metadata, as processed in-core, is committed to (stored on) the storage array 150; whereas the retirement of log entries ensures that the entries accumulated in the volume layer log 345 synchronize with the metadata checkpoints committed to the storage array 150 by, e.g., retiring those accumulated log entries prior to the checkpoint. In one or more embodiments, the checkpoint and retirement of log entries may be data driven, periodic or both.

In an embodiment, the extent store layer 350 is responsible for storing extents on the SSDs 260 (i.e., on the storage array 150) and for providing the extent keys to the volume layer 340 (e.g., in response to a forwarded write request). The extent store layer 350 is also responsible for retrieving data (e.g., an existing extent) using an extent key (e.g., in response to a forwarded read request). In an alternative embodiment, the extent store layer 350 is responsible for performing de-duplication and compression on the extents prior to storage. The extent store layer 350 may maintain in-core mappings (e.g., embodied as hash tables) of extent keys to SSD storage locations (e.g., offset on an SSD 260 of array 150). The extent store layer 350 may also maintain a dedicated log 355 of entries that accumulate requested "put" and "delete" operations (i.e., write requests and delete requests for extents issued from other layers to the extent store layer 350), where these operations change the in-core mappings (i.e., hash table entries). Subsequently, the in-core mappings and contents of the extent store layer log 355 may be written to the storage array 150 in accordance with a "fuzzy" checkpoint 390 (i.e., checkpoint with incremental changes that span multiple log files) in which selected in-core mappings, less than the total, are committed to the array 150 at various intervals (e.g., driven by an amount of change to the in-core mappings, size thresholds of log 355, or periodically). Notably, the accumulated entries in log 355 may be retired once all in-core mappings have been committed and then, illustratively, for those entries prior to the first interval.

In an embodiment, the RAID layer 360 may organize the SSDs 260 within the storage array 150 as one or more RAID groups (e.g., sets of SSDs) that enhance the reliability and integrity of extent storage on the array by writing data "stripes" having redundant information, i.e., appropriate parity information with respect to the striped data, across a given number of SSDs 260 of each RAID group. The RAID layer 360 may also store a number of stripes (e.g., stripes of sufficient depth), e.g., in accordance with a plurality of contiguous range write operations, so as to reduce data relocation (i.e., internal flash block management) that may occur within the SSDs as a result of the operations. In an embodiment, the storage layer 365 implements storage I/O drivers that may communicate directly with hardware (e.g., the storage controllers and cluster interface) cooperating with the operating system kernel 224, such as a Linux virtual function I/O (VFIO) driver.

Write Path

Figure 4:
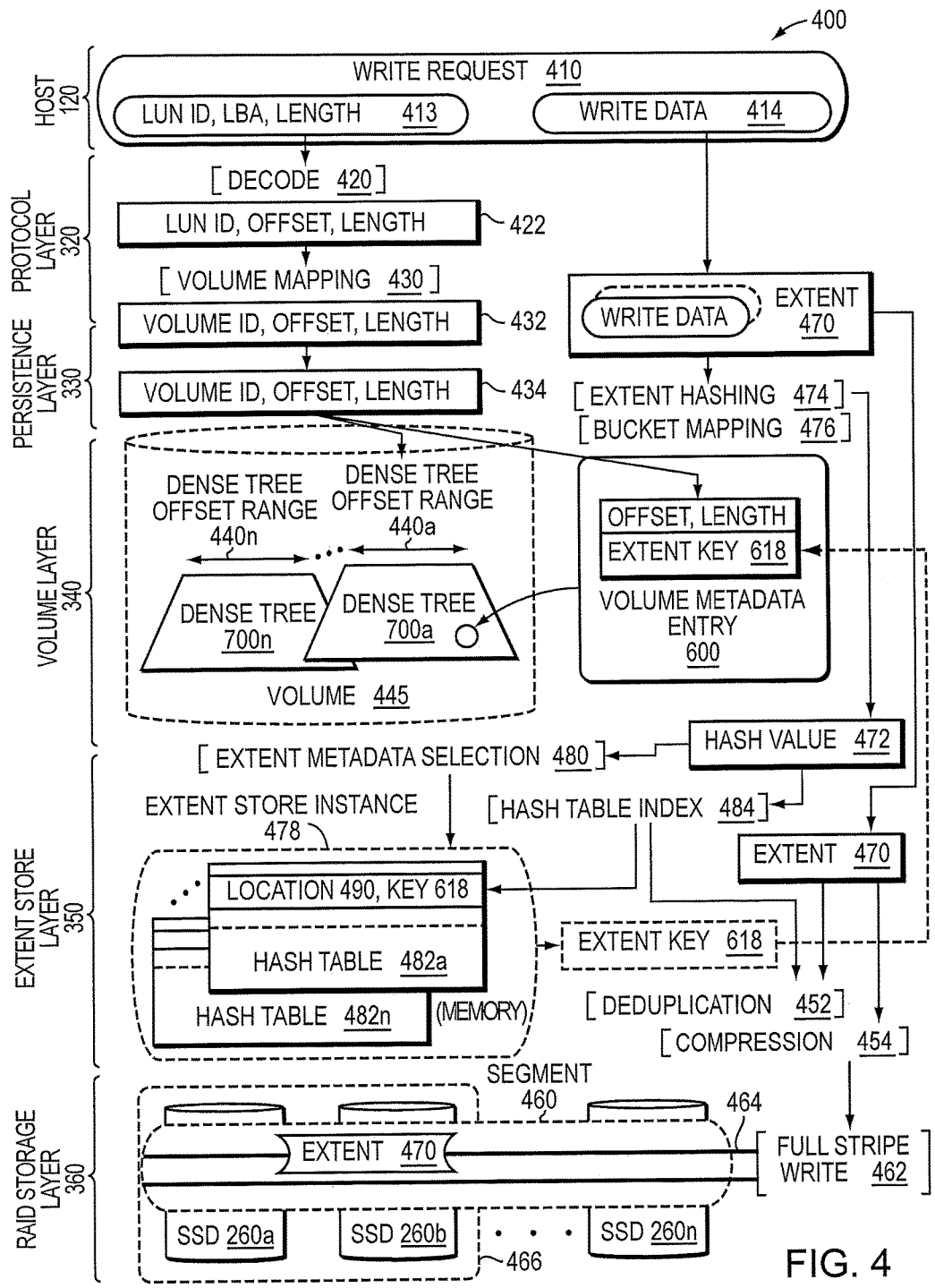
FIG. 4 illustrates a write path of the storage I/O stack.

FIG. 4 illustrates an I/O (e.g., write) path 400 of the storage I/O stack 300 for processing an I/O request, e.g., a SCSI write request 410. The write request 410 may be issued by host 120 and directed to a LUN stored on the storage arrays 150 of the cluster 100. Illustratively, the protocol layer 320 receives and processes the write request by decoding 420 (e.g., parsing and extracting) fields of the request, e.g., LUN ID, LBA and length (shown at 413), as well as write data 414. The protocol layer 320 may use the results 422 from decoding 420 for a volume mapping technique 430 (described above) that translates the LUN ID and LBA range (i.e., equivalent offset and length) of the write request to an appropriate volume layer instance, i.e., volume ID (volume 445), in the cluster 100 that is responsible for managing volume metadata for the LBA range. In an alternative embodiment, the persistence layer 330 may implement the above described volume mapping technique 430. The protocol layer then passes the results 432, e.g., volume ID, offset, length (as well as write data), to the persistence layer 330, which records the request in the persistence layer log 335 and returns an acknowledgement to the host 120 via the protocol layer 320. As described herein, the persistence layer 330 may aggregate and organize write data 414 from one or more write requests into a new extent 470 and perform a hash computation, i.e., a hash function, on the new extent to generate a hash value 472 in accordance with an extent hashing technique 474.

The persistence layer 330 may then pass the write request with aggregated write data including, e.g., the volume ID, offset and length, as parameters 434 to the appropriate volume layer instance. In an embodiment, message passing of the parameters 434 (received by the persistence layer)

may be redirected to another node via the function shipping mechanism, e.g., RPC, for inter-node communication. Alternatively, message passing of the parameters 434 may be via the IPC mechanism, e.g., message threads, for intra-node communication.

In one or more embodiments, a bucket mapping technique 476 is provided that translates the hash value 472 to an instance of an appropriate extent store layer (e.g., extent store instance 478) that is responsible for storing the new extent 470. Note that the bucket mapping technique may be implemented in any layer of the storage I/O stack above the extent store layer. In an embodiment, for example, the bucket mapping technique may be implemented in the persistence layer 330, the volume layer 340, or a layer that manages cluster-wide information, such as a cluster layer (not shown). Accordingly, the persistence layer 330, the volume layer 340, or the cluster layer may contain computer executable instructions executed by the CPU 210 to perform operations that implement the bucket mapping technique 476 described herein. The persistence layer 330 may then pass the hash value 472 and the new extent 470 to the appropriate volume layer instance and onto the appropriate extent store instance via an extent store put operation. The extent hashing technique 474 may embody an approximately uniform hash function to ensure that any random extent to be written may have an approximately equal chance of falling into any extent store instance 478, i.e., hash buckets are evenly distributed across extent store instances of the cluster 100 based on available resources. As a result, the bucket mapping technique 476 provides load-balancing of write operations (and, by symmetry, read operations) across nodes 200 of the cluster, while also leveling flash wear in the SSDs 260 of the cluster.

In response to the put operation, the extent store instance may process the hash value 472 to perform an extent metadata selection technique 480 that (i) selects an appropriate hash table 482 (e.g., hash table 482a) from a set of hash tables (illustratively in-core) within the extent store instance 478, and (ii) extracts a hash table index 484 from the hash value 472 to index into the selected hash table and lookup a table entry having an extent key 618 identifying a storage location 490 on SSD 260 for the extent. Accordingly, the persistence layer 330, the volume layer 340, or the cluster layer may contain computer executable instructions executed by the CPU 210 to perform operations that implement the extent metadata selection technique 480 described herein. If a table entry with a matching extent key is found, then the SSD location 490 mapped from the extent key 618 is used to retrieve an existing extent (not shown) from SSD. The existing extent is then compared with the new extent 470 to determine whether their data is identical. If the data is identical, the new extent 470 is already stored on SSD 260 and a de-duplication opportunity (denoted de-duplication 452) exists such that there is no need to write another copy of the data. Accordingly, a reference count (not shown) in the table entry for the existing extent is incremented and the extent key 618 of the existing extent is passed to the appropriate volume layer instance for storage within an entry (denoted as volume metadata entry 600) of a dense tree metadata structure (e.g., dense tree 700a), such that the extent key 618 is associated an offset range 440 (e.g., offset range 440a) of the volume 445.

However, if the data of the existing extent is not identical to the data of the new extent 470, a collision occurs and a deterministic algorithm is invoked to sequentially generate as many new candidate extent keys (not shown) mapping to the same bucket as needed to either provide de-duplication 452 or produce an extent key that is not already stored within the extent store instance. Notably, another hash table (e.g. hash table 482n) may be selected by a new candidate extent key in accordance with the extent metadata selection technique 480. In the event that no de-duplication opportunity exists (i.e., the extent is not already stored) the new extent 470 is compressed in accordance with compression technique 454 and passed to the RAID layer 360, which processes the new extent 470 for storage on SSD 260 within one or more stripes 464 of RAID group 466. The extent store instance may cooperate with the RAID layer 360 to identify a storage segment 460 (i.e., a portion of the storage array 150) and a location on SSD 260 within the segment 460 in which to store the new extent 470. Illustratively, the identified storage segment is a segment with a large contiguous free space having, e.g., location 490 on SSD 260b for storing the extent 470.

In an embodiment, the RAID layer 360 then writes the stripes 464 across the RAID group 466, illustratively as one or more full write stripe 462. The RAID layer 360 may write a series of stripes 464 of sufficient depth to reduce data relocation that may occur within the flash-based SSDs 260 (i.e., flash block management). The extent store instance then (i) loads the SSD location 490 of the new extent 470 into the selected hash table 482n (i.e., as selected by the new candidate extent key) and (ii) passes a new extent key (denoted as extent key 618) to the appropriate volume layer instance for storage within an entry (also denoted as volume metadata entry 600) of a dense tree 700 managed by that volume layer instance, and (iii) records a change to extent metadata of the selected hash table in the extent store layer log 355. Illustratively, the volume layer instance selects dense tree 700a spanning an offset range 440a of the volume 445 that encompasses the offset range of the write request. As noted, the volume 445 (e.g., an offset space of the volume) is partitioned into multiple regions (e.g., allotted as disjoint offset ranges); in an embodiment, each region is represented by a dense tree 700. The volume layer instance then inserts the volume metadata entry 600 into the dense tree 700a and records a change corresponding to the volume metadata entry in the volume layer log 345. Accordingly, the I/O (write) request is sufficiently stored on SSD 260 of the cluster.

Read Path

Figure 5:
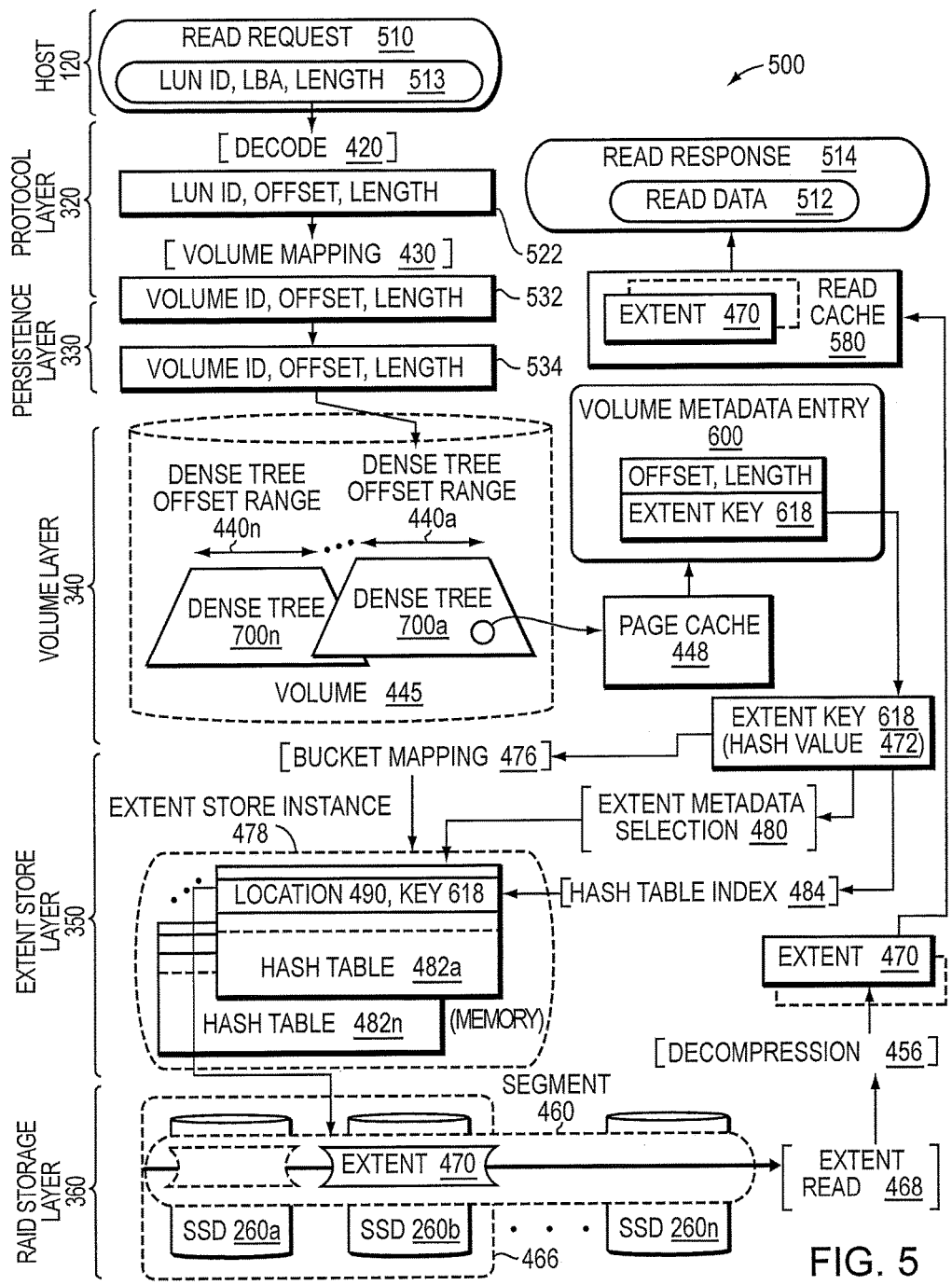
FIG. 5 illustrates a read path of the storage I/O stack.

FIG. 5 illustrates an I/O (e.g., read) path 500 of the storage I/O stack 300 for processing an I/O request, e.g., a SCSI read request 510. The read request 510 may be issued by host 120 and received at the protocol layer 320 of a node 200 in the cluster 100. Illustratively, the protocol layer 320 processes the read request by decoding 420 (e.g., parsing and extracting) fields of the request, e.g., LUN ID, LBA, and length (shown at 513), and uses the results 522, e.g., LUN ID, offset, and length, for the volume mapping technique 430. That is, the protocol layer 320 may implement the volume mapping technique 430 (described above) to translate the LUN ID and LBA range (i.e., equivalent offset and length) of the read request to an appropriate volume layer instance, i.e., volume ID (volume 445), in the cluster 100 that is responsible for managing volume metadata for the LBA (i.e., offset) range. The protocol layer then passes the results 532 to the persistence layer 330, which may search the write cache 380 to determine whether some or all of the read request can be service from its cache data. If the entire request cannot be serviced from the cached data, the persistence layer 330 may then pass the remaining portion of the request including, e.g., the volume ID, offset and length, as parameters 534 to the appropriate volume layer instance in accordance with the function shipping mechanism (e.g., RPC, for inter-node communication) or the IPC mechanism (e.g., message threads, for intra-node communication).

The volume layer instance may process the read request to access a dense tree metadata structure (e.g., dense tree 700a) associated with a region (e.g., offset range 440a) of a volume 445 that encompasses the requested offset range (specified by parameters 532). The volume layer instance may further process the read request to search for (lookup) one or more volume metadata entries 600 of the dense tree 700a to obtain one or more extent keys 618 associated with one or more extents 470 within the requested offset range. As described further herein, each dense tree 700 may be embodied as multiple levels of a search structure with possibly overlapping offset range entries at each level. The entries, i.e., volume metadata entries 600, provide mappings from host-accessible LUN addresses, i.e., LBAs, to durable extent keys. The various levels of the dense tree may have volume metadata entries 600 for the same offset, in which case the higher level has the newer entry and is used to service the read request. A top level of the dense tree 700 is illustratively resident in-core and a page cache 448 may be used to access lower levels of the tree. If the requested range or portion thereof is not present in the top level, a metadata page associated with an index entry at the next lower tree level is accessed. The metadata page (i.e., in the page cache 448) at the next level is then searched (e.g., a binary search) to find any overlapping entries. This process is then iterated until one or more volume metadata entries 600 of a level are found to ensure that the extent key(s) 618 for the entire requested read range are found. If no metadata entries exist for the entire or portions of the requested read range, then the missing portion(s) are zero filled.

Once found, each extent key 618 is processed by the volume layer 340 to, e.g., implement the bucket mapping technique 476 that translates the extent key to an appropriate extent store instance 478 responsible for storing the requested extent 470. Note that, in an embodiment, each extent key 618 may be substantially identical to the hash value 472 associated with the extent 470, i.e., the hash value as calculated during the write request for the extent, such that the bucket mapping 476 and extent metadata selection 480 techniques may be used for both write and read path operations. Note also that the extent key 618 may be derived from the hash value 472. The volume layer 340 may then pass the extent key 618 (i.e., the hash value from a previous write request for the extent) to the appropriate extent store instance 478 (via an extent store get operation), which performs an extent key-to-SSD mapping to determine the location on SSD 260 for the extent.

In response to the get operation, the extent store instance may process the extent key 618 (i.e., hash value 472) to perform the extent metadata selection technique 480 that (i) selects an appropriate hash table (e.g., hash table 482a) from a set of hash tables within the extent store instance 478, and (ii) extracts a hash table index 484 from the extent key 618 (i.e., hash value 472) to index into the selected hash table and lookup a table entry having a matching extent key 618 that identifies a storage location 490 on SSD 260 for the extent 470. That is, the SSD location 490 mapped to the extent key 618 may be used to retrieve the existing extent (denoted as extent 470) from SSD 260 (e.g., SSD 260b). The extent store instance then cooperates with the RAID layer 360 to access the extent on SSD 260b and retrieve the data contents in accordance with the read request. Illustratively, the RAID layer 360 may read the extent in accordance with an extent read operation 468 and pass the extent 470 to the extent store instance. The extent store instance may then decompress the extent 470 in accordance with a decompression technique 456, although it will be understood to those skilled in the art that decompression can be performed at any layer of the storage I/O stack 300. The extent 470 may be stored in a buffer (not shown) in memory 220 and a reference to that buffer may be passed back through the layers of the storage I/O stack. The persistence layer may then load the extent into a read cache 580 (or other staging mechanism) and may extract appropriate read data 512 from the read cache 580 for the LBA range of the read request 510. Thereafter, the protocol layer 320 may create a SCSI read response 514, including the read data 512, and return the read response to the host 120.

Dense Tree Volume Metadata

As noted, a host-accessible LUN may be apportioned into multiple volumes, each of which may be partitioned into one or more regions, wherein each region is associated with a disjoint offset range, i.e., a LBA range, owned by an instance of the volume layer 340 executing on a node 200. For example, assuming a maximum volume size of 64 terabytes (TB) and a region size of 16 gigabytes (GB), a volume may have up to 4096 regions (i.e., 16 GB×4096=64 TB). In an embodiment, region 1 may be associated with an offset range of, e.g., 0-16 GB, region 2 may be associated with an offset range of 16 GB-32 GB, and so forth. Ownership of a region denotes that the volume layer instance manages metadata, i.e., volume metadata, for the region, such that I/O requests destined to a LBA range within the region are directed to the owning volume layer instance. Thus, each volume layer instance manages volume metadata for, and handles I/O requests to, one or more regions. A basis for metadata scale-out in the distributed storage architecture of the cluster 100 includes partitioning of a volume into regions and distributing of region ownership across volume layer instances of the cluster.

Volume metadata, as well as data storage, in the distributed storage architecture is illustratively extent based. The volume metadata of a region that is managed by the volume layer instance is illustratively embodied as in memory (in-core) and on SSD (on-flash) volume metadata configured to provide mappings from host-accessible LUN addresses, i.e., LBAs, of the region to durable extent keys. In other words, the volume metadata maps LBA ranges of the LUN to data of the LUN (via extent keys) within the respective LBA range. In an embodiment, the volume layer organizes the volume metadata (embodied as volume metadata entries 600) as a data structure, i.e., a dense tree metadata structure (dense tree 700), which maps an offset range within the region to one or more extent keys. That is, the LUN data (user data) stored as extents (accessible via extent keys) is associated with LUN LBA ranges represented as volume metadata (also stored as extents).

Figure 6:
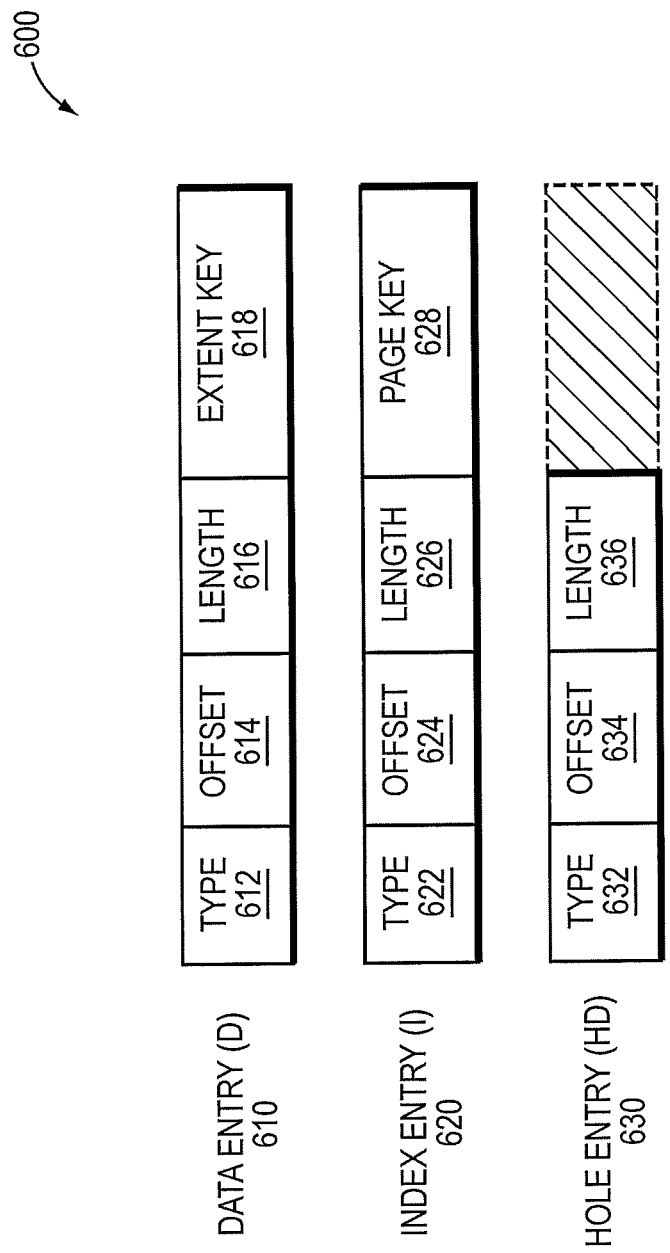
FIG. 6 is a block diagram of a volume metadata entry.

FIG. 6 is a block diagram of a volume metadata entry 600 of the dense tree metadata structure. Each volume metadata entry 600 of the dense tree 700 may be a descriptor that embodies one of a plurality of types, including a data entry (D) 610, an index entry (I) 620, and a hole entry (H) 630. The data entry (D) 610 is configured to map (offset, length) to an extent key for an extent (user data) and includes the following content: type 612, offset 614, length 616 and extent key 618. The index entry (I) 620 is configured to map (offset, length) to a page key (e.g., an extent key) of a metadata page (stored as an extent), i.e., a page containing one or more volume metadata entries, at a next lower level of the dense tree; accordingly, the index entry 620 includes the following content: type 622, offset 624, length 626 and page key 628. Illustratively, the index entry 620 manifests as a pointer from a higher level to a lower level, i.e., the index entry 620 essentially serves as linkage between the different levels of the dense tree. The hole entry (H) 630 represents absent data as a result of a hole punching operation at (offset, length) and includes the following content: type 632, offset 634, and length 636.

Figure 7:
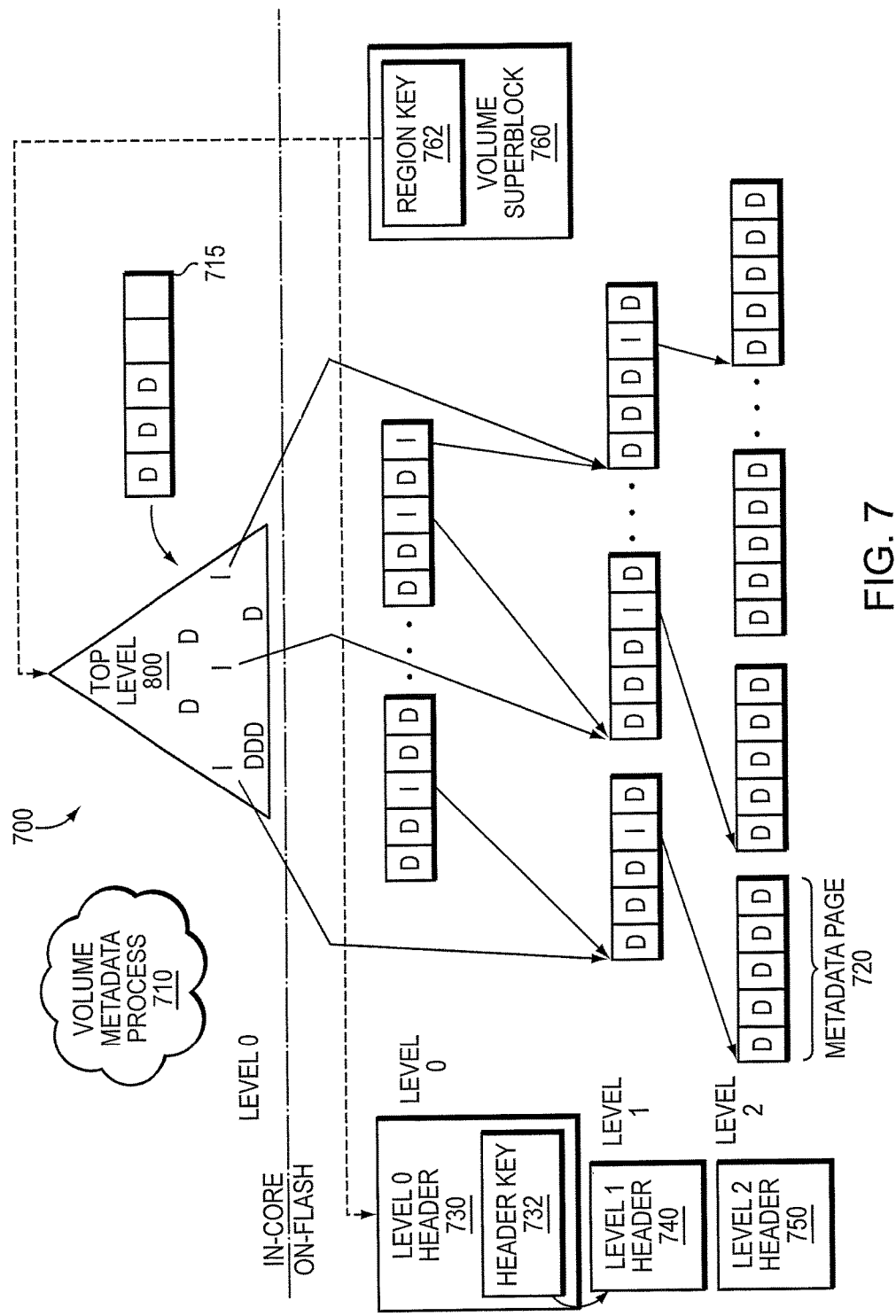
FIG. 7 is a block diagram of a dense tree metadata structure.

FIG. 7 is a block diagram of the dense tree metadata structure that may be advantageously used with one or more embodiments described herein. The dense tree metadata structure 700 is configured to provide mappings of logical offsets within a LUN (or volume) to extent keys managed by one or more extent store instances. Illustratively, the dense tree metadata structure is organized as a multi-level dense tree 700, where a top level 800 represents recent volume metadata changes and subsequent descending levels represent older changes. Specifically, a higher level of the dense tree 700 is updated first and, when that level fills, an adjacent lower level is updated, e.g., via a merge operation. A latest version of the changes may be searched starting at the top level of the dense tree and working down to the descending levels. Each level of the dense tree 700 includes fixed size records or entries, i.e., volume metadata entries 600, for storing the volume metadata. A volume metadata process 710 illustratively maintains the top level 800 of the dense tree in memory (in-core) as a balanced tree that enables indexing by offsets. The volume metadata process 710 also maintains a fixed sized (e.g., 4 KB) in-core buffer as a staging area (i.e., an in-core staging buffer 715) for volume metadata entries 600 inserted into the balanced tree (i.e., top level 800). Each level of the dense tree is further maintained on-flash as a packed array of volume metadata entries, wherein the entries are stored as extents illustratively organized as fixed sized (e.g., 4 KB) metadata pages 720. Notably, the staging buffer 715 is de-staged to SSD upon a trigger, e.g., the staging buffer is full. In an embodiment, each metadata page 720 has a unique identifier (ID) which guarantees that no two metadata pages can have the same content. That is, no duplicate pages are stored, but a metadata page may be referenced multiple times.

In an embodiment, the multi-level dense tree 700 includes three (3) levels, although it will be apparent to those skilled in the art that additional levels N of the dense tree may be included depending on parameters (e.g., size) of the dense tree configuration. Illustratively, the top level 800 of the tree is maintained in-core as level 0 and the lower levels are maintained on-flash as levels 1 and 2. In addition, copies of the volume metadata entries 600 stored in staging buffer 715 may also be maintained on-flash as, e.g., a level 0 linked list. A leaf level, e.g., level 2, of the dense tree contains data entries 610, whereas a non-leaf level, e.g., level 0 or 1, may contain both data entries 610 and index entries 620. Each index entry (I) 620 at level N of the tree is configured to point to (reference) a metadata page 720 at level N+1 of the tree. Each level of the dense tree 600 also includes a header (e.g., level 0 header 730, level 1 header 740 and level 2 header 750) that contains per level information, such as reference counts associated with the extents. Each upper level header contains a header key (an extent key for the header, e.g., header key 732 of level 0 header 730) to a corresponding lower level header. A region key 762 to a root, e.g., level 0 header 730 (and top level 800), of the dense tree 700 is illustratively stored on-flash and maintained in a volume root extent, e.g., a volume superblock 760. Notably, the volume superblock 760 contains region keys to the roots of the dense tree metadata structures for all regions in a volume.

Figure 8:
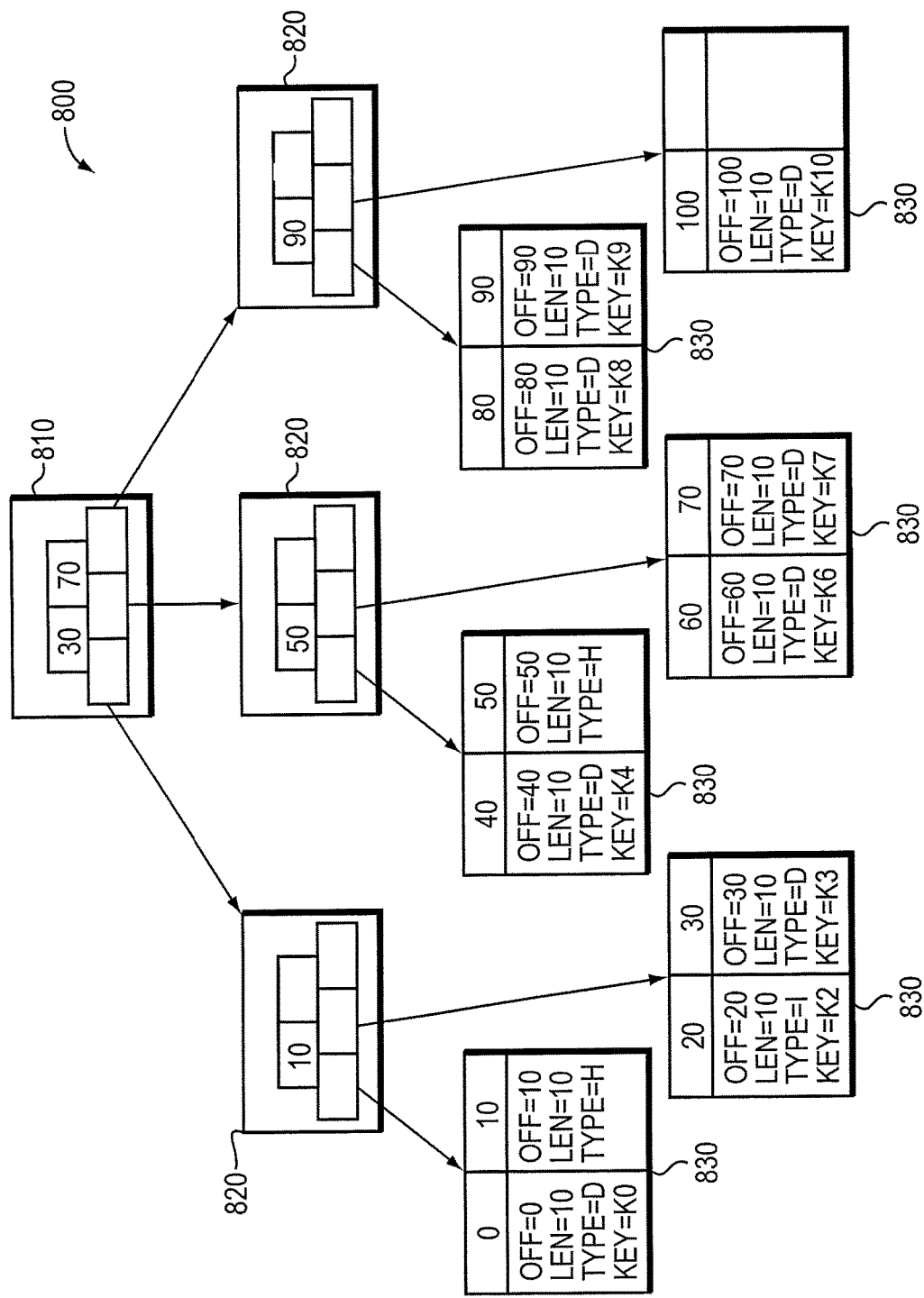
FIG. 8 is a block diagram of a top level of the dense tree metadata structure.

FIG. 8 is a block diagram of the top level 800 of the dense tree metadata structure. As noted, the top level (level 0) of the dense tree 700 is maintained in-core as a balanced tree, which is illustratively embodied as a B+ tree data structure. However, it will be apparent to those skilled in the art that other data structures, such as AVL trees, Red-Black trees, and heaps (partially sorted trees), may be advantageously used with the embodiments described herein. The B+ tree (top level 800) includes a root node 810, one or more internal nodes 820 and a plurality of leaf nodes (leaves) 830. The volume metadata stored on the tree is preferably organized in a manner that is efficient both to search in order to service read requests and to traverse (walk) in ascending order of offset to accomplish merges to lower levels of the tree. The B+ tree has certain properties that satisfy these requirements, including storage of all data (i.e., volume metadata entries 600) in leaves 830 and storage of the leaves as sequentially accessible, e.g., as one or more linked lists. Both of these properties make sequential read requests for write data (i.e., extents) and read operations for dense tree merge more efficient. Also, since it has a much higher fan-out than a binary search tree, the illustrative B+ tree results in more efficient lookup operations. As an optimization, the leaves 830 of the B+ tree may be stored in a page cache 448, making access of data more efficient than other trees. In addition, resolution of overlapping offset entries in the B+ tree optimizes read requests of extents. Accordingly, the larger the fraction of the B+ tree (i.e., volume metadata) maintained in-core, the less loading (reading) or metadata from SSD is required so as to reduce read amplification.

Figure 9:
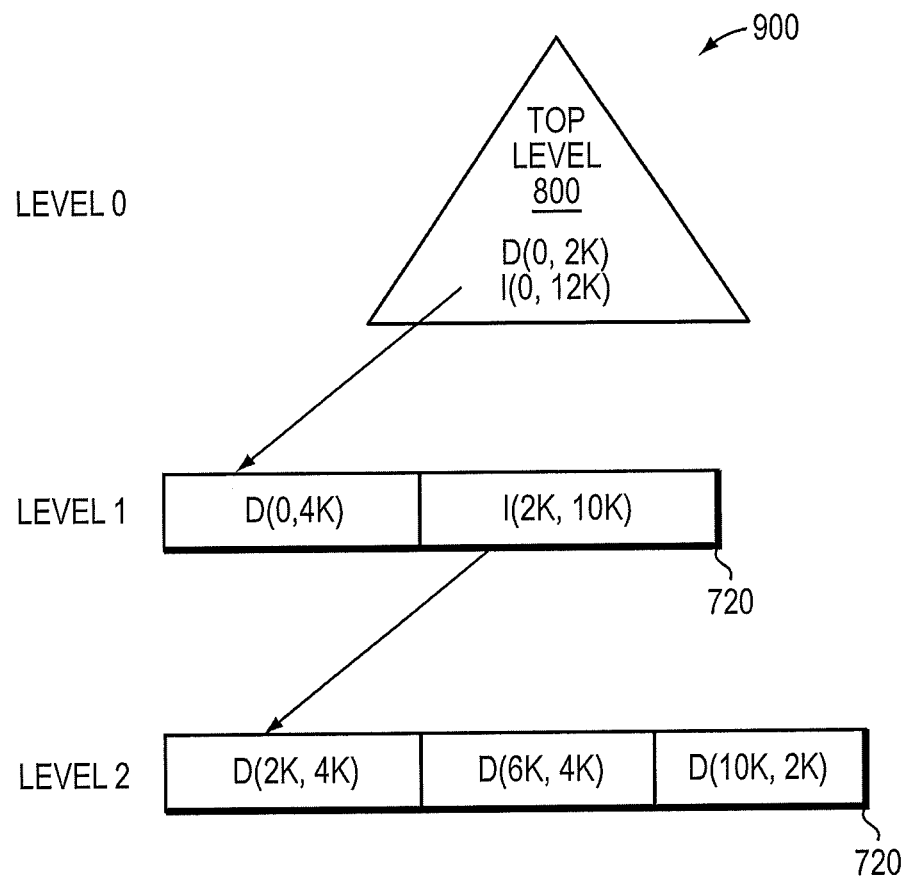
FIG. 9 illustrates mapping between levels of the dense tree metadata structure.

FIG. 9 illustrates mappings 900 between levels of the dense tree metadata structure. Each level of the dense tree 700 includes one or more metadata pages 720, each of which contains multiple volume metadata entries 600. In an embodiment, each volume metadata entry 600 has a fixed size, e.g., 12 bytes, such that a predetermined number of entries may be packed into each metadata page 720. As noted, the data entry (D) 610 is a map of (offset, length) to an address of (user) data which is retrievable using extent key 618 (i.e., from an extent store instance). The (offset, length) illustratively specifies an offset range of a LUN. The index entry (I) 620 is a map of (offset, length) to a page key 628 of a metadata page 720 at the next lower level. Illustratively, the offset in the index entry (I) 620 is the same as the offset of the first entry in the metadata page 720 at the next lower level. The length 626 in the index entry 620 is illustratively the cumulative length of all entries in the metadata page 720 at the next lower level (including gaps between entries).

For example, the metadata page 720 of level 1 includes an index entry "I(2K,10K)" that specifies a starting offset 2K and an ending offset 12K (i.e., 2K+10K=12K); the index entry (I) illustratively points to a metadata page 720 of level 2 covering the specified range. An aggregate view of the data entries (D) packed in the metadata page 720 of level 2 covers the mapping from the smallest offset (e.g., 2K) to the largest offset (e.g., 12K). Thus, each level of the dense tree 700 may be viewed as an overlay of an underlying level. For instance the data entry "D(0,4K)" of level 1 overlaps 2K of the underlying metadata in the page of level 2 (i.e., the range 2K,4K).

Figure 10:
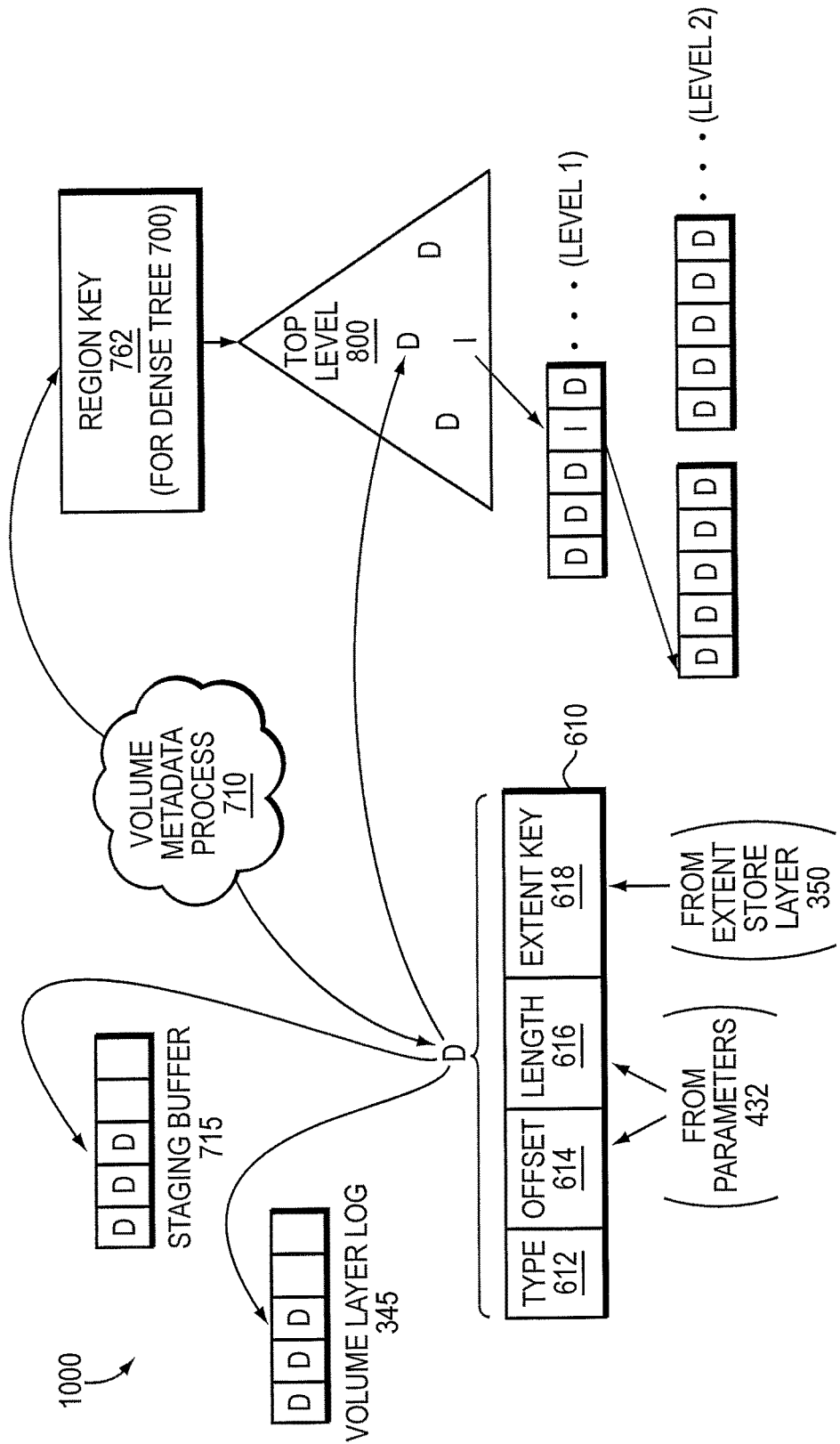
FIG. 10 illustrates a workflow for inserting a volume metadata entry into the dense tree metadata structure in accordance with a write request.

In one or more embodiments, operations for volume metadata managed by the volume layer 340 include insertion of volume metadata entries, such as data entries 610, into the dense tree 700 for write requests. As noted, each dense tree 700 may be embodied as multiple levels of a search structure with possibly overlapping offset range entries at each level, wherein each level is a packed array of entries (e.g., sorted by offset) and where leaf entries have an LBA range (offset, length) and extent key. FIG. 10 illustrates a workflow 1000 for inserting a volume metadata entry into the dense tree metadata structure in accordance with a write request. In an embodiment, volume metadata updates (changes) to the dense tree 700 occur first at the top level of the tree, such that a complete, top-level description of the changes is maintained in memory 220. Operationally, the volume metadata process 710 applies the region key 762 to access the dense tree 700 (i.e., top level 800) of an appropriate region (e.g., LBA range 440 as determined from the parameters 432 derived from the write request 410). Upon completion of a write request, the volume metadata process 710 creates a volume metadata entry, e.g., a new data entry 610, to record a mapping of offset/length-to-extent key (i.e., LBA range-to-user data). Illustratively, the new data entry 610 includes an extent key 618 (i.e., from the extent store layer 350) associated with data (i.e., extent 470) of the write request 410, as well as offset 614 and length 616 (i.e., from the write parameters 432) and type 612 (i.e., data entry D).

The volume metadata process 710 then updates the volume metadata by inserting (adding) the data entry D into the level 0 staging buffer 715, as well as into the top level 800 of dense tree 700 and the volume layer log 345. In the case of an overwrite operation, the overwritten extent and its mapping should be deleted. The deletion process is similar to that of hole punching (un-map). When the level 0 is full, i.e., no more entries can be stored, the volume metadata entries 600 from the level 0 in-core are merged to lower levels (maintained on SSD), i.e., level 0 merges to level 1 which may then merge to level 2 and so on (e.g., a single entry added at level 0 may trigger a merger cascade). Note, any entries remaining in the staging buffer 715 after level 0 is full also may be merged to lower levels. The level 0 staging buffer is then emptied to allow space for new entries 600.

Dense Tree Volume Metadata Checkpointing

When a level of the dense tree 700 is full, volume metadata entries 600 of the level are merged with the next lower level of the dense tree. As part of the merge, new index entries 620 are created in the level to point to new lower level metadata pages 720, i.e., data entries from the level are merged (and pushed) to the lower level so that they may be "replaced" with an index reference in the level. The top level 800 (i.e., level 0) of the dense tree 700 is illustratively maintained in-core such that a merge operation to level 1 facilitates a checkpoint to SSD 260. The lower levels (i.e., levels 1 and/or 2) of the dense tree are illustratively maintained on-flash and updated (e.g., merged) as a batch operation (i.e., processing the entries of one level with those of a lower level) when the higher levels are full. The merge operation illustratively includes a sort, e.g., a 2-way merge sort operation. A parameter of the dense tree 700 is the ratio K of the size of level N−1 to the size of level N. Illustratively, the size of the array at level N is K times larger than the size of the array at level N−1, i.e., sizeof(level N)=K*sizeof(level N−1). After K merges from level N−1, level N becomes full (i.e., all entries from a new, fully-populated level N−1 are merged with level N, iterated K times.)

Figure 11:
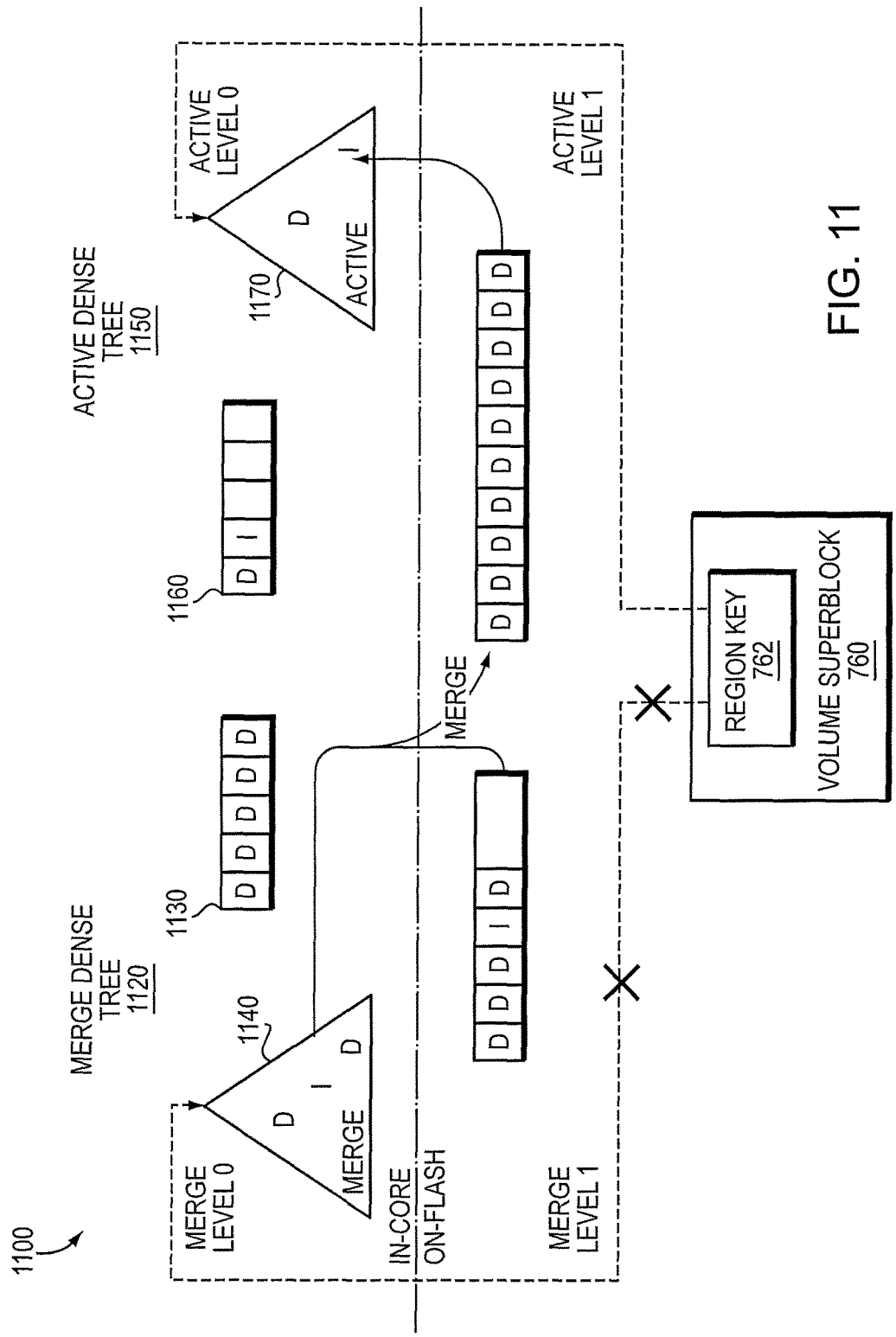
FIG. 11 illustrates merging between levels of the dense tree metadata structure.

FIG. 11 illustrates merging 1100 between levels, e.g., levels 0 and 1, of the dense tree metadata structure. In an embodiment, a merge operation is triggered when level 0 is full. When performing the merge operation, the dense tree metadata structure transitions to a "merge" dense tree structure (shown at 1120) that merges, while an alternate "active" dense tree structure (shown at 1150) is utilized to accept incoming data. Accordingly, two in-core level 0 staging buffers 1130, 1160 are illustratively maintained for concurrent merge and active (write) operations, respectively. In other words, an active staging buffer 1160 and active top level 1170 of active dense tree 1150 handle in-progress data flow (i.e, active user read and write requests), while a merge staging buffer 1130 and merge top level 1140 of merge dense tree 1120 handle consistency of the data during a merge operation. That is, a "double buffer" arrangement may be used to maintain consistency of data (i.e., entries in the level 0 of the dense tree) while processing active operations.

During the merge operation, the merge staging buffer 1130, as well as the top level 1140 and lower level array (e.g., merge level 1) are read-only and are not modified. The active staging buffer 1160 is configured to accept the incoming (user) data, i.e., the volume metadata entries received from new put operations are loaded into the active staging buffer 1160 and added to the top level 1170 of the active dense tree 1150. Illustratively, merging from level 0 to level 1 within the merge dense tree 1120 results in creation of a new active level 1 for the active dense tree 1150, i.e., the resulting merged level 1 from the merge dense tree is inserted as a new level 1 into the active dense tree. A new index entry I is computed to reference the new active level 1 and the new index entry I is loaded into the active staging buffer 1160 (as well as in the active top level 1170). Upon completion of the merge, the region key 762 of volume superblock 760 is updated to reference (point to) the root, e.g., active top level 1170 and active level 0 header (not shown), of the active dense tree 1150, thereby deleting (i.e., rendering inactive) merge level 0 and merge level 1 of the merge dense tree 1120. The merge staging buffer 1130 thus becomes an empty inactive buffer until the next merge. The merge data structures (i.e., the merge dense tree 1120 including staging buffer 1130) may be maintained in-core and "swapped" as the active data structures at the next merge (i.e., "double buffered").

Snapshot and/or Clones

As noted, the LUN ID and LBA (or LBA range) of an I/O request are used to identify a volume (e.g., of a LUN) to which the request is directed, as well as the volume layer (instance) that manages the volume and volume metadata associated with the LBA range. Management of the volume and volume metadata may include data management functions, such as creation of snapshots and/or clones, for the LUN. Illustratively, the snapshots/clones may be represented as independent volumes accessible by host 120 as LUNs, and embodied as respective read-only copies, i.e., snapshots, and read-write copies, i.e., clones, of the volume (hereinafter "parent volume") associated with the LBA range. The volume layer 340 may interact with other layers of the storage I/O stack 300, e.g., the persistence layer 330 and the administration layer 310, to manage both administration aspects, e.g., snapshot/clone creation, of the snapshot and clone volumes, as well as the volume metadata, i.e., in-core mappings from LBAs to extent keys, for those volumes. Accordingly, the administration layer 310, persistence layer 330, and volume layer 340 contain computer executable instructions executed by the CPU 210 to perform operations that create and manage the snapshots and clones described herein.

In one or more embodiments, the volume metadata managed by the volume layer, i.e., parent volume metadata and snapshot/clone metadata, is illustratively organized as one or more multi-level dense tree metadata structures, wherein each level of the dense tree metadata structure (dense tree)

includes volume metadata entries for storing the metadata. Each snapshot/clone may be derived from a dense tree of the parent volume (parent dense tree) to thereby enable fast and efficient snapshot/clone creation in terms of time and consumption of metadata storage space. To that end, portions (e.g., levels or volume metadata entries) of the parent dense tree may be shared with the snapshot/clone to support time and space efficiency of the snapshot/clone, i.e., portions of the parent volume divergent from the snapshot/clone volume are not shared. Illustratively, the parent volume and clone may be considered "active," in that each actively processes (i.e., accepts) additional I/O requests which modify or add (user) data to the respective volume; whereas a snapshot is read-only and, thus, does not modify volume (user) data, but may still process non-modifying I/O requests (e.g., read requests).

Figure 12:
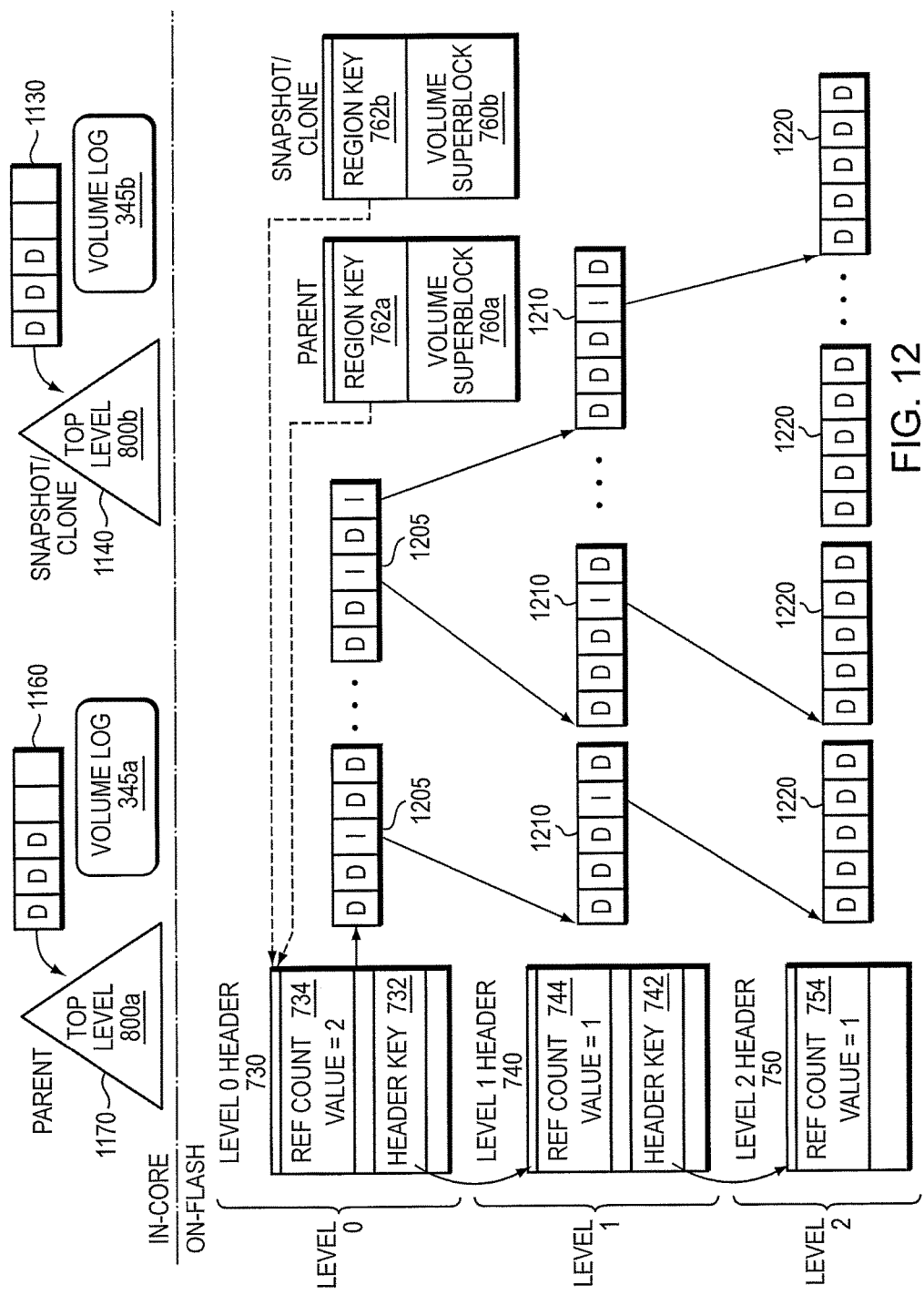
FIG. 12 is a block diagram of a dense tree metadata structure shared between a parent volume and snapshot/clone.

FIG. 12 is a block diagram of a dense tree metadata structure shared between a parent volume and a snapshot/clone. In an embodiment, creation of a snapshot/clone may include copying an in-core portion of the parent dense tree to a dense tree of the snapshot/clone (snapshot/clone dense tree). That is, the in-core level 0 staging buffer and in-core top level of the parent dense tree may be copied to create the in-core portion of the snapshot/clone dense tree, i.e., parent staging buffer 1160 may be copied to create snapshot/clone staging buffer 1130, and top level 800a (shown at 1170) may be copied to create snapshot/clone top level 800b (shown at 1140). Note that although the parent volume layer log 345a may be copied to create snapshot/clone volume layer log 345b, the volume metadata entries of the parent volume log 345a recorded (i.e., logged) after initiation of snapshot/clone creation may not be copied to the log 345b, as those entries may be directed to the parent volume and not to the snapshot/clone. Lower levels of the parent dense tree residing on SSDs may be initially shared between the parent volume and snapshot/clone. As the parent volume and snapshot/clone diverge, the levels may split to accommodate new data. That is, as new volume metadata entries are written to a level of the parent dense tree, that level is copied (i.e., split) to the snapshot/clone dense tree so that the parent dense tree may diverge from its old (now copied to the snapshot/clone) dense tree structure.

A reference counter may be maintained for each level of the dense tree, illustratively within a respective level header (reference counters 734, 744, 754) to track sharing of levels between the volumes (i.e., between the parent volume and snapshot/clone). Illustratively, the reference counter may increment when levels are shared and decremented when levels are split (e.g., copied). For example, a reference count value of 1 may indicate an unshared level (i.e., portion) between the volumes (i.e., has only one reference). In an embodiment, volume metadata entries of a dense tree do not store data, but only reference data (as extents) stored on the storage array 150 (e.g., on SSDs 260). Consequently, more than one level of a dense tree may reference the same extent (data) even when the level reference counter is 1. This may result from a split (i.e., copy) of a dense tree level brought about by creation of the snapshot/clone. Accordingly, a separate reference count is maintained for each extent in the extent store layer to track sharing of extents among volumes.

In an embodiment, the reference counter 734 for level 0 (in a level-0 header) may be incremented, illustratively from value 1 to 2, to indicate that the level 0 array contents are shared by the parent volume and snapshot/clone. Illustratively, the volume superblock of the parent volume (parent volume superblock 760a) and a volume superblock of the snapshot/clone (snapshot/clone volume superblock 760b) may be updated to point to the level-0 header, e.g., via region key 762a,b. Notably, the copies of is the in-core data structures may be rendered in conjunction with the merge operation (described with reference to FIG. 11) such that the "merge dense tree 1120" copy of in-core data structures (e.g., the top level 1140 and staging buffer 1130) may become the in-core data structures of the snapshot/clone dense tree by not deleting (i.e., maintaining as active rather than rendering inactive) those copied in-core data structures. In addition, the snapshot/clone volume superblock 760b may be created by the volume layer 340 in response to an administrative operation initiated by the administration layer 310.

Figure 13:
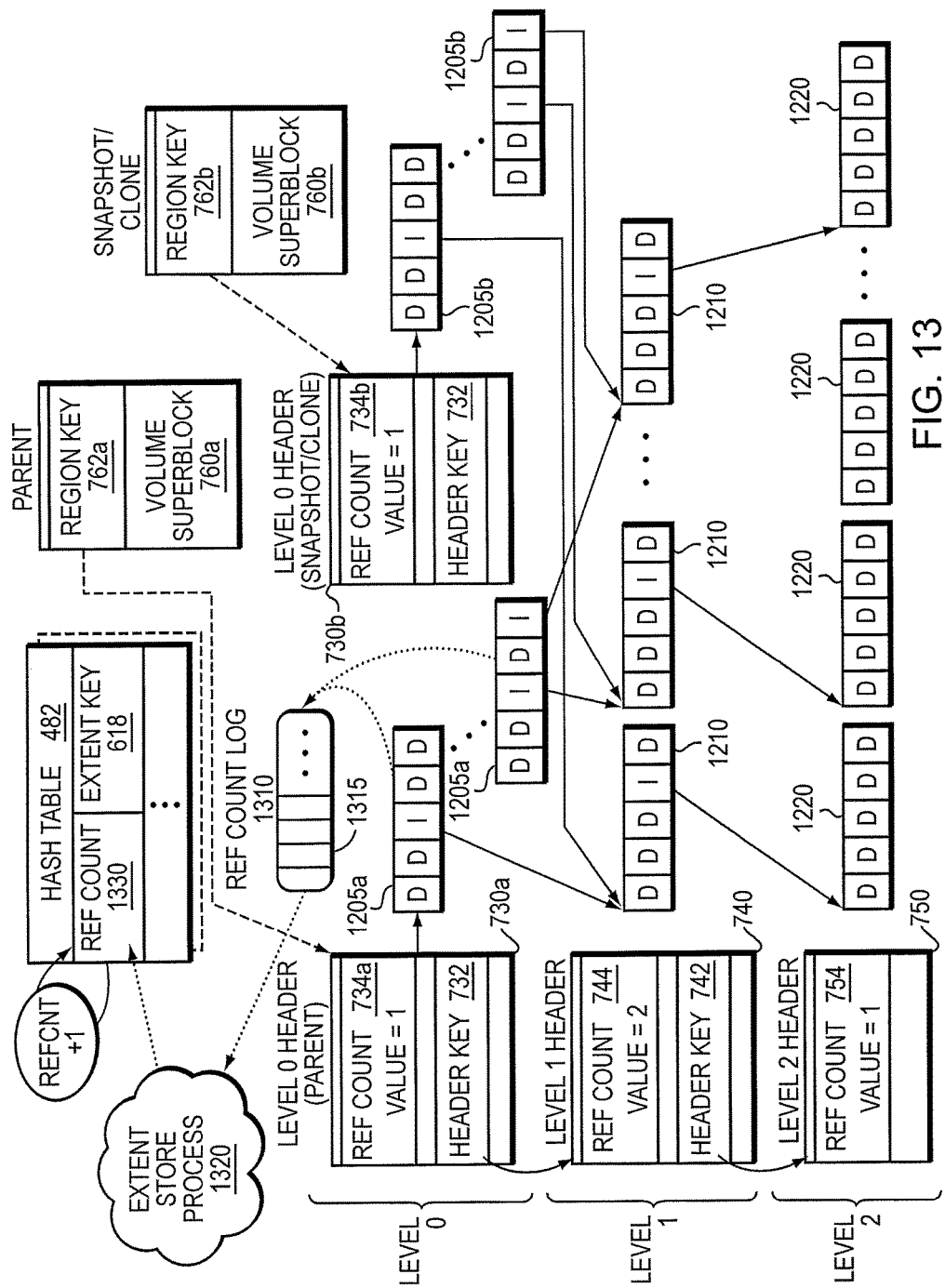
FIG. 13 illustrates diverging of the snapshot/clone from the parent volume.

Over time, the snapshot/clone may split or diverge from the parent volume when either modifies the level 0 array as a result of new I/O operations, e.g., a write request. FIG. 13 illustrates diverging of the snapshot/clone from the parent volume. In an embodiment, divergence as a result of modification to the level 0 array 1205a of the parent volume illustratively involves creation of a copy of the on-flash level 0 array for the snapshot/clone (array 1205b), as well as creation of a copy of the level 0 header 730a for the snapshot/clone (header 730b). As a result, the on-flash level 1 array 1210 becomes a shared data structure between the parent volume and snapshot/clone. Accordingly, the reference counters for the parent volume and snapshot/clone level 0 arrays may be decremented (i.e., ref count 734a and 734b of the parent volume and snapshot/clone level 0 headers 730a, 730b, respectively), because each level 0 array now has one less reference (e.g., the volume superblocks 760a and 760b each reference separate level 0 arrays 1205a and 1205b). In addition, the reference counter 744 for the shared level 1 array may be incremented (e.g., the level 1 array is referenced by the two separate level 0 arrays, 1205a and 1205b). Notably, a reference counter 754 in the header 750 for the next level, i.e., level 2, need not be incremented because no change in references from level 1 to level 2 have been made, i.e., the single level 1 array 1210 still references level 2 array 1220.

Similarly, over time, level N (e.g., levels 1 or 2) of the snapshot/clone may diverge from the parent volume when that level is modified, for example, as a result of a merge operation. In the case of level 1, a copy of the shared level 1 array may be created for the snapshot/clone such that the on-flash level 2 array becomes a shared data structure between the level 1 array of the parent volume and a level 1 array of the snapshot/clone (not shown). Reference counters 744 for the parent volume level 1 array and the snapshot/clone level 1 array (not shown) may be decremented, while the reference counter 754 for the shared level 2 array may be incremented. Note that this technique may be repeated for each dense tree level that diverges from the parent volume, i.e., a copy of the lowest (leaf) level (e.g., level 2) of the parent volume array may be created for the snapshot/clone. Note also that as long as the reference counter is greater than 1, the data contents of the array are pinned (cannot be deleted).

Nevertheless, the extents for each data entry in the parent volume and the snapshot/clone (e.g., the level 0 array 1205a,b) may still have two references (i.e., the parent volume and snapshot/clone) even if the reference count 734a,b of the level 0 header 730a,b is 1. That is, even though the level 0 arrays (1205a and 1205b) may have separate volume layer references (i.e., volume superblocks 760a and 760b), the underlying extents 470 may be shared and, thus, may be referenced by more than one volume (i.e., the parent volume and snapshot/clone). Note that the parent volume and snapshot/clone each reference (initially) the same extents 470 in the data entries, i.e., via extent key 618 in data entry 610, of their respective level 0 arrays 1205*a,b*. Accordingly, a reference counter associated with each extent 470 may be incremented to track multiple (volume) references to the extent, i.e., to prevent inappropriate deletion of the extent. Illustratively, a reference counter associated with each extent key 618 may be embodied as an extent store (ES) reference count (refcount) 1330 stored in an entry of an appropriate hash table 482 serviced by an extent store process 1320. Incrementing of the ES refcount 1330 for each extent key (e.g., in a data entry 610) in level 0 of the parent volume may be a long running operation, e.g., level 0 of the parent volume may contain thousands of data entries. This operation may illustratively be performed in the background through a refcount log 1310, which may be stored persistently on SSD.

Illustratively, extent keys 618 obtained from the data entries 610 of level 0 of the parent volume may be queued, i.e., recorded, by the volume metadata process 710 (i.e., the volume layer instance servicing the parent volume) on the refcount log 1310 as entries 1315. Extent store process 1320 (i.e., the extent store layer instance servicing the extents) may receive each entry 1315 and increment the refcount 1330 of the hash table entry containing the appropriate the extent key. That is, the extent store process/instance 1320 may index (e.g., search using the extent metadata selection technique 480) the hash tables 482*a-n* to find an entry having the extent key in the ref count log entry 1315. Once the hash table entry is found, the refcount 1330 of that entry may be incremented (e.g., refcnt+1). Notably, the extent store instance may process the ref count log entries 1315 at a different priority (i.e., higher or lower) than "put" and "get" operations from user I/O requests directed to that instance.

As used herein, clones are writeable copies of a volume, whereas snapshots are not writeable (i.e., read-only) copies. When a clone is created, a new LUN is created and any volume copies are associated with the cloned (new) LUN. On the other hand, in an embodiment, a snapshot does not have an associated host-visible LUN, which prevents any I/O requests (e.g., read/write requests) from being directed to the snapshot, so as to avoid host operating system errors arising from the need to mark (i.e., write to) newly discovered LUNs. Read/write requests to a snapshot are allowed by creating a clone of the snapshot. The clone that is created for snapshot access is created using the copy mechanism described herein and thus has its own LUN which is host-visible. As such, the snapshot copy remains intact from which further clones may be created. Notably, the snapshot may be identified (e.g., via a name) by the host using administrative commands (e.g., "create snapshot X", "delete snapshot X"), but is otherwise not directly visible as a LUN, unless a clone is created from the snapshot.

In an embodiment, there is a 1-to-1 mapping between LUN and volume, wherein a LUN is a logical entity from the perspective of a SCSI target (SCSIT) visible by the host and a volume is a logical entity from the perspective of the persistence and volume layers.

Snapshot Workflow

The embodiments described herein are directed to a technique for efficiently creating a snapshot for a LUN served by the storage I/O stack. In addition, the technique efficiently creates one or more snapshots for a group of LUNs organized as a consistency group (CG) (i.e., a set of LUNs having collectively applied management operations) and served by storage I/O stacks executing on a plurality of nodes of the cluster. To that end, the technique involves a plurality of indivisible operations (i.e., transactions) of a snapshot creation workflow administered by a Storage Area Network (SAN) administration layer (SAL) (e.g., included in the administration layer 310) of the storage I/O stack in response to a snapshot create request issued by a host. The SAL administers the snapshot creation workflow by initiating a set of transactions that includes, inter alia, (i) installation of barriers for LUNs (volumes) across all nodes in the cluster that participate in snapshot creation, (ii) creation of point-in-time (PIT) markers to record those I/O requests that are included in the snapshot, and (iii) updating of records (entries) in snapshot and volume tables of the cluster database (CDB) 244.

Illustratively, a CG allows a set of LUNS to be grouped together, so that management operations may be applied to the group collectively. That is, operations such as creating snapshots, restoring snapshots, and replication operate on the CG group as a whole. Further, such operations may be synchronized such that a snapshot taken for a CG ensures that write order dependencies are preserved across the set of LUNs in the CG by making sure that the snapshot is crash consistent and approximately contemporaneous across the set of LUNs.

A snapshot, e.g., a "top level snapshot", may be a LUN snapshot or a CG snapshot. To create a crash consistent image for the CG and to ensure fast and efficient creation of the snapshot, as well as recovery of the snapshot from a crash, the technique provides a snapshot creation workflow. The SAL administers the snapshot creation workflow by initiating a set of operations or transactions that includes, inter alia, (i) creation of records (entries) in snapshot and volume tables of the CDB, (ii) creation of barriers for LUNs (volumes) across all nodes in the cluster that participate in snapshot creation, (iii) creation of point-in-time (PIT) markers to record those I/O requests that are included in the snapshot, and (iv) updating of the records in the snapshot and volume tables of the CDB. In an embodiment, the volume table of the CDB stores details (e.g., volume UUID), of all volumes (i.e., LUNs) in the cluster and the snapshot table of the CDB stores details (e.g., snapshot name, snapshot ID) of all snapshots serviced by the cluster.

Installation of a barrier for each LUN of, e.g., a single volume or set of volumes in the CG, is illustratively performed in accordance with the workflow using a 2-phase transaction protocol. A barrier set message is issued by the SAL to the persistence layer to set a barrier flag for each LUN in an in-memory volume structure, wherein setting of the flag manifests establishment of a barrier delimiting I/O requests (i.e., I/O requests received before establishment of the barrier are permitted on the LUN). The persistence layer illustratively records and maintains the barrier in-memory (in-core) using a sequence number of a write request beyond which no further write requests are allowed to proceed. In an alternative embodiment, the persistence layer may persistently record the barrier in, e.g., NVLOG. Each node in the cluster may install the barrier during the transaction (i.e., barrier set message). An acknowledgement is then returned to the SAL to complete the barrier installation Installation of a barrier in the persistence layer ensures that from the point of installation, all new (i.e., later than establishment of the barrier) I/O (write) requests directed to the LUN are blocked (queued) at the persistence layer. In an embodiment, the persistence layer may process the I/O requests, log the requests in the NVLOG and load the requests into the write-back cache 380 (e.g., queued in a log). However, the barrier prevents the queued I/O requests from being forwarded to the volume layer. Setting of barriers on all LUNs of the CG also ensures that no replies (acknowledgements) to write requests are returned to the host beyond the point of the barrier so as to prevent any subsequent write data from being included in a snapshot on one of the volumes (LUNs) of the CG and not on the other volumes of the CG. In other word, barriers are installed on all volumes of the CG to ensure creation of a consistent snapshot by, e.g., preventing acknowledgement of the I/O (write) requests to the host, which would allow the host to proceed to issue additional I/O requests. Thus, the barriers effectively delimit the I/O requests to a volume (LUN) that are blocked in the persistence layer to prevent acknowledgements back to the host that the writes are completed. If any node in the cluster servicing the LUN (i.e., the LUN being snapshotted) fails to install the barrier, the transaction is rejected (i.e., the barrier set message) and an error may be returned to the host in response to the snapshot create request. Illustratively, a discard phase of the protocol removes the barrier in the event of rejection or failure (e.g., crash).

The snapshot creation workflow also includes creation and recordation of the PIT marker using a PIT transaction for each LUN of, e.g., the single volume or set of volumes in the CG using a 2-phase transaction protocol. Upon validating that each node installed the barrier for each LUN, the persistence layer creates and records the respective PIT marker for each LUN using, e.g., a sequence number of the PIT transaction, a snapshot ID (UUID) and a volume UUID for each service in the persistence layer. In an embodiment, the persistence layer records and maintains the PIT marker in core (in memory), although in an alternative embodiment, the persistence layer may persistently record the PIT marker in, e.g., NVLOG. Illustratively, only one in-flight snapshot operation is performed at a time such that there is only one PIT marker per volume until the snapshot creation workflow is complete. However, in an alternate embodiment, multiple in-flight snapshot operations using multiple PIT markers may be performed per volume, wherein the multiple PIT markers are maintained and recorded as described herein. If recording of the PIT is successful for each LUN, a commit point of the snapshot creation workflow may be realized wherein the transaction commits. Once the PIT is recorded by the persistence layer, the barrier(s) may be removed and SAL may reply to the host that the snapshot is completed (while other operations described herein occur in the background). Once recorded in NVLog, the PIT is persistently (and safely) stored such that if a crash occurs, the queued write requests included up to the PIT marker may be replayed to ensure a consistent state from the perspective of the host.

The persistence layer may then forward (flush) all the queued write requests up to (but not beyond) the PIT marker associated with the volume to the volume layer. Notably, there may be multiple streams within the volume that flush the write requests to the volume layer. In addition, barrier semantics are maintained by the persistence layer with respect to I/O requests such that (i) a write request initially arriving at the cluster prior to the PIT, but not finishing arrival until after the PIT, is queued and not sent to the volume layer (i.e., write requests crossing the sequence number of the PIT); and (ii) write requests are not coalesced such that they straddle the PIT sequence number (i.e., a first write request arriving before the PIT is not combined with a second write request arriving after the PIT).

In an embodiment, when each stream encounters the PIT marker, a service process (service) in the persistence layer sends a snapshot create message to a corresponding service of the volume layer. The service of the persistence layer may send the snapshot create message to a corresponding service of the volume layer upon receiving a reply from the volume layer for all I/O requests received up to the PIT. That is, the persistence layer waits for I/O requests that are deemed part of the snapshot (i.e., arriving before the PIT) to be acknowledged by the volume layer prior to issuing the snapshot create message.

In response to the snapshot create message, the corresponding service of the volume layer creates a snapshot by, e.g., sharing level 0 of the source volume dense tree with the snapshot dense tree as described previously. As noted, creation of the snapshot is further manifested by incrementing the reference count in the level headers (e.g., level 0 header) of the dense tree and updating of the superblock. In an embodiment, the persistence layer also logs a snapshot create done record to the NVLog, e.g., to ensure that replay ignores all write requests up to the PIT for the volume. The persistence layer may then start sending write requests that follow (i.e., later than) the PIT sequence number in subsequent flushes. Illustratively, the done records carry sufficient information (such as, e.g., the UUID of the snapshot volume) to indicate which snapshot volume is complete. The volume layer then sends a message to the SAL when snapshot creation has completed for all of the services. Once the snapshot is created, the persistence layer may resume forwarding writes beyond the PIT to the volume layer.

Upon receiving the message from the volume layer, the SAL updates two tables of the CDB at the same time, i.e., the volume table and the LUN (snapshot) table. Illustratively, SAL marks the snapshot volume state to "ONLINE" in the CDB volume table. In addition, the snapshot for the LUN is marked as "CREATED" in the CDB snapshot table. Once the snapshot for all the snapshot volumes in the CG are created, the SAL marks the CG snapshot as "CREATED" in the CDB snapshot table. The snapshot is then considered online and may be accessed.

Figure 14:
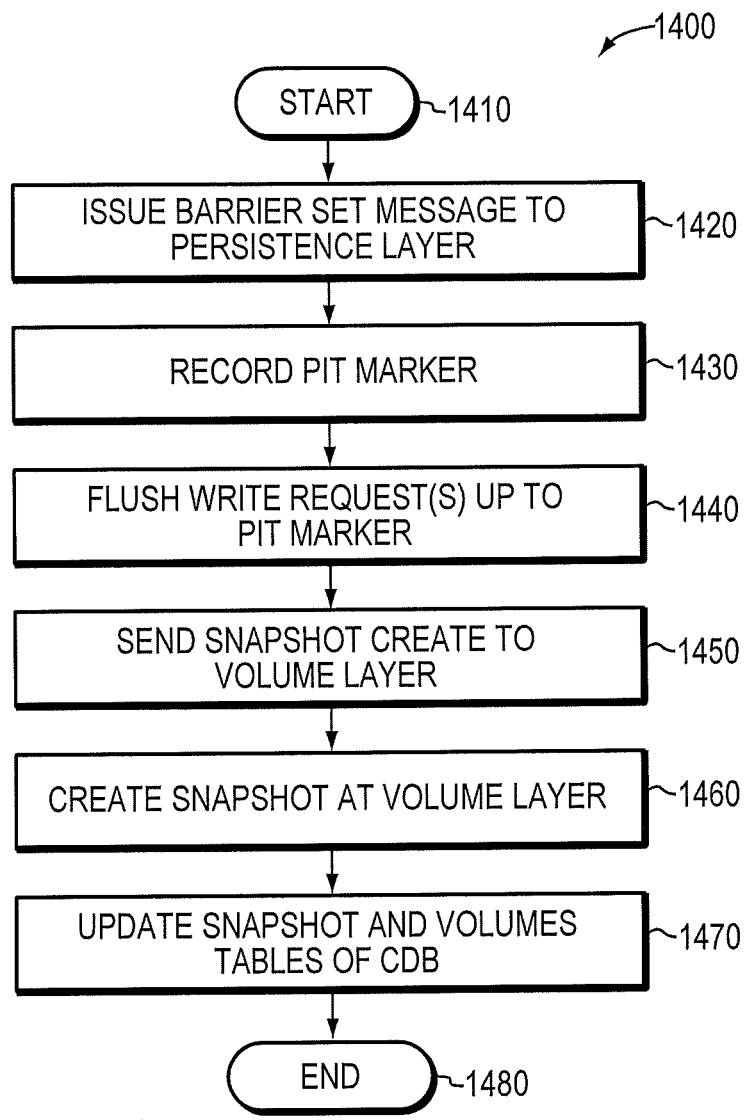
FIG. 14 is a flowchart illustrating a snapshot create workflow procedure directed to creation of a snapshot for a single LUN.

FIG. 14 is a flowchart illustrating a snapshot create workflow procedure directed to creation of a snapshot for a single LUN (volume). The procedure starts at step 1410 and proceeds to step 1420 where SAL issues a barrier set message to the persistence layer of the storage I/O stack and, in response, the persistence layer sets (installs) a barrier on the volume for the snapshot. Installation of the barrier ensures that all new I/O (write) requests (i.e., subsequent to the point of installation) directed to the LUN are temporarily stored (queued) at the persistence layer. At step 1430, the persistence layer records a marker, i.e., a point in time (PIT) marker, for the LUN that establishes a cutoff point for write requests included in the snapshot. Notably, the persistence layer may remove the barrier once the PIT marker is recorded and allow new I/O (write) requests to be processed by the persistence layer. At step 1440, the persistence layer flushes the queued write requests up to the PIT marker as one or more streams to a volume layer of the storage I/O stack. When each stream encounters the PIT marker, a service in the persistence layer sends a snapshot create message to a corresponding service of the volume layer at step 1450 after all I/O (write) requests sent to the volume layer prior to the PIT marker are completed. In response, the volume layer creates the snapshot at step 1460. In an embodiment, creation of the snapshot includes, inter alia, sharing level 0 keys of a dense tree between the volume and the snapshot, incrementing a reference count in level headers of dense tree, and updating a superblock of the snapshot. Upon creation of the snapshot, SAL updates volume and snapshot tables of the CDB to render the snapshot online and accessible at step 1470 and the procedure ends at step 1480.

Figure 15:
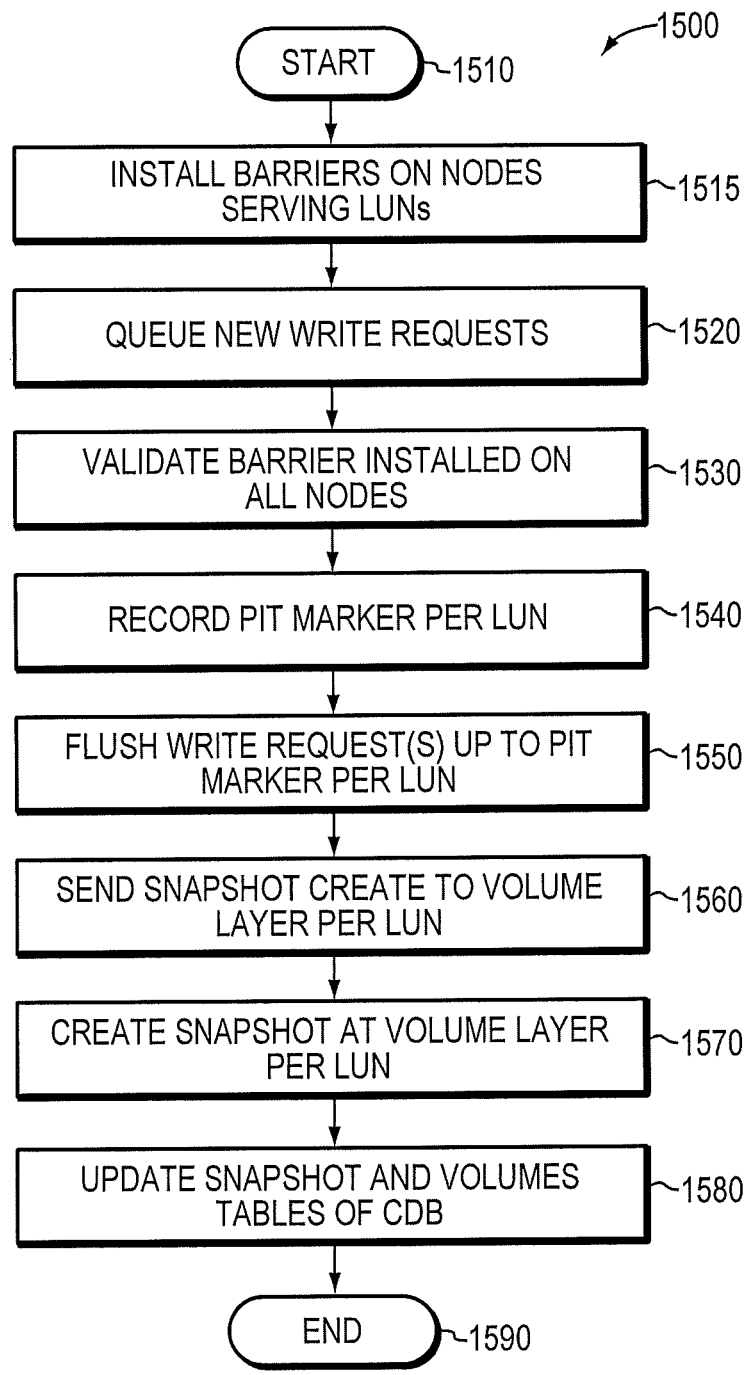
FIG. 15 is a flowchart illustrating a snapshot create workflow procedure directed to creation of a snapshot for a group of LUNs organized as a Consistency Group.

FIG. 15 is a flowchart illustrating a snapshot create workflow procedure directed to creation of a snapshot for a group of LUNs organized as a CG. According to the technique, SAL manages all operations of the workflow in parallel to preserve write order dependencies across the LUNs of the CG, thereby ensuring that the snapshot is crash consistent across the LUNs. To that end, the procedure starts at step 1510 and proceeds to step 1515 where barriers are installed on all nodes of the cluster having LUNs (volumes) of the CG. At step 1520, new write requests are queued at the persistence layer of each node to ensure that a snapshot of the CG is consistent across all volumes. At step 1530, the persistence layer validates that the barriers are installed on all of the nodes. At step 1540, the persistence layer records a PIT marker for each LUN of the CG and, at step 1550, flushes the queued write requests up to the PIT marker as streams to the volume layer. At step 1560, services of the persistence layer send snapshot create messages to corresponding services of the volume layer. The volume layer creates the snapshots of the CG at step1570 and, at step 1580, SAL updates the tables of the CDB to indicate that the snapshots are rendered online and accessible. The procedure the ends at step 1590.

Advantageously, the technique provides a cluster-wide synchronization mechanism for snapshotting one or more LUNs in a consistent and unified manner across one or more nodes of the cluster. Operations are executed in parallel at various layers (persistence and volume layers) of the storage I/O stack using barriers to synchronize creation of the snapshots across the layers (and nodes) of the cluster. Barriers are then released (i.e., lifted) to allow I/O requests queued at the persistence layer (i.e., the I/O requests blocked by the barriers) to propagate down I/O paths of the storage I/O stack for execution by the layers of the stack. Upon creation of the snapshots, a global (cluster) database is updated to reflect new states of snapshots, LUNs (volumes) and CG.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software encoded on a tangible (non-transitory) computer-readable medium (e.g., disks, electronic memory, and/or CDs) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method comprising:
    receiving a first write request directed towards a first logical unit (LUN), the first write request having a data, a logical block address (LBA) and a length representing an address range of the first LUN, the LBA and the length mapped to a first volume associated with the first LUN, the first write request processed at a storage system having a memory and attached to a storage array;
    receiving a second write request directed to the first LUN;
    in response to receiving a snapshot request from a host, initiating a first barrier on the first volume such that the second write request is blocked;
    flushing the first write request by associating a key with the data;
    storing the key in a metadata entry included in a metadata structure, the metadata entry associated with the address range; and
    creating a first snapshot of the first volume.

2. The method of claim 1 further comprising:
    recording a point-in-time (PIT) marker on a non-volatile storage device, wherein the first write request is received before the PIT marker is recorded and the second write request is received after the PIT marker is recorded;
    removing the first barrier from the first volume; and
    processing the second write request.

3. The method of claim 2 wherein the first and second write requests are associated with first and second sequence numbers respectively, wherein the PIT marker is associated with the first sequence number.

4. The method of claim 1 wherein creating the first snapshot of the first volume further comprises:
    sharing the metadata entry between the first volume and a copy of the first volume by increasing a reference count associated with the metadata entry.

5. The method of claim 1 further comprising:
    determining whether to coalesce the first and second write requests; and
    in response initiating the first barrier, determining not to coalesce the first and second write requests.

6. The method of claim 2 further comprising:
    recording the first and second write requests in a replay log;
    recording a record in the replay log corresponding to the recording of the PIT marker; and
    in response to a crash of the storage system, ignoring replay of the first write request for the first LUN.

7. The method of claim 2 wherein the PIT marker includes a snapshot identifier and a volume identifier.

8. The method of claim 1 further comprising:
    creating a group including the first LUN and a second LUN, wherein the second LUN is associated with a second volume; and
    in response to the snapshot request from the host directed towards the group, initiating a second barrier on the second volume and creating a second snapshot of the second volume.

9. The method of claim 1 wherein the second write request is not blocked for more than a predetermined period.

10. A system comprising:
    a cluster having a plurality of nodes;
    a storage array coupled to the cluster;
    a first instance of a storage I/O stack executing on a first node of the cluster, the first instance of the storage I/O stack configured to:
        receive a first write request directed towards a first logical unit (LUN), the first write request having a data, a logical block address (LBA) and a length representing an address range of the first LUN, the LBA and the length mapped to a volume associated with the first LUN;
    a second instance of the storage I/O stack executing on a second node of the cluster, the second instance of the storage I/O stack when configured to:
        receive a second write request directed to a second LUN;
        associate the first and second LUNs with a group;
        in response to receiving a snapshot request for the group from a host, send a barrier message to the first node to establish a first barrier on the volume and initiating a second barrier on the volume at the second node;

determine whether the first and second barriers are established; and in response to determining that the first and second barriers are established, create snapshots of the first and second LUNs.

11. A system comprising:

a storage system having a memory connected to a processor via a bus;

a storage array coupled to the storage system;

a storage I/O stack executing on the processor of the storage system, the storage I/O stack configured to:

receive a first write request directed towards a first logical unit (LUN), the first write request having a data, a logical block address (LBA) and a length representing an address range of the first LUN, the LBA and the length mapped to a first volume associated with the first LUN;

receive a second write request directed to the first LUN;

in response to receiving a snapshot request from a host, initiate a first barrier on the first volume such that the second write request is blocked;

flush the first write request by associating a key with the data;

store the key in a metadata entry included in a metadata structure, the metadata entry associated with the address range; and create a first snapshot of the first volume.

12. The system of claim 11 wherein the storage I/O stack is further configured to:

record a point-in-time (PIT) marker on a non-volatile storage device, wherein the first write request is received before the PIT marker is recorded and the second write request is received after the PIT marker is recorded;

remove the first barrier from the first volume; and process the second write request.

13. The system of claim 12 wherein the first and second write requests are associated with first and second sequence numbers respectively, wherein the PIT marker is associated with the first sequence number.

14. The system of claim 11 wherein the storage I/O stack configured to create the first snapshot of the first volume is further configured to:

share the metadata entry between the first volume and a copy of the first volume by increasing a reference count associated with the metadata entry.

15. The system of claim 11 wherein the storage I/O stack is further configured to:

determine whether to coalesce the first and second write requests; and in response initiating the first barrier, determine not to coalesce the first and second write requests.

16. The system of claim 12 wherein the storage I/O stack is further configured to:

record the first and second write requests in a replay log;

record a record in the replay log corresponding to the recording of the PIT marker; and in response to a crash of the storage system, ignore replay of the first write request for the first LUN.

17. The system of claim 12 wherein the PIT marker includes a snapshot identifier and a volume identifier.

18. The system of claim 11 wherein the storage I/O stack is further configured to:

create a group including the first LUN and a second LUN, wherein the second LUN is associated with a second volume; and in response to the snapshot request from the host directed towards the group, initiate a second barrier on the second volume and create a second snapshot of the second volume.

19. The system of claim 11 wherein the second write request is not blocked for more than 10 seconds.

20. The system of claim 18 wherein the storage I/O stack is further configured to:

record a point-in-time (PIT) marker on a non-volatile storage device, wherein the PIT delimits I/O requests such that an I/O request received after the PIT is blocked, and wherein the PIT is applied to the first and second volumes.

* * * * *

UNITED STATES PATENT AND TRADEMARK OFFICE
CERTIFICATE OF CORRECTION

| | | |
|---|---|---|
| PATENT NO. | : 9,740,566 B2 | Page 1 of 1 |
| APPLICATION NO. | : 14/869340 | |
| DATED | : August 22, 2017 | |
| INVENTOR(S) | : Ling Zheng et al. | |

It is certified that error appears in the above-identified patent and that said Letters Patent is hereby corrected as shown below:

In the Claims

Claim 10, Column 24, Line 62 reads:
storage I/O stack when configured to:
Should read:
storage I/O stack configured to:

Signed and Sealed this
Twenty-fourth Day of April, 2018

Andrei Iancu
*Director of the United States Patent and Trademark Office*